(12) United States Patent
Sano

(10) Patent No.: US 7,900,938 B2
(45) Date of Patent: Mar. 8, 2011

(54) SUSPENSION SYSTEM FOR VEHICLE

(75) Inventor: Katsuyuki Sano, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/811,966

(22) PCT Filed: Nov. 28, 2008

(86) PCT No.: PCT/JP2008/072112
§ 371 (c)(1),
(2), (4) Date: Jul. 7, 2010

(87) PCT Pub. No.: WO2009/096094
PCT Pub. Date: Aug. 6, 2009

(65) Prior Publication Data
US 2010/0276896 A1    Nov. 4, 2010

(30) Foreign Application Priority Data
Jan. 29, 2008  (JP) .................. 2008-018011

(51) Int. Cl.
*B60G 17/00* (2006.01)
*B60G 17/018* (2006.01)

(52) U.S. Cl. ............... 280/5.502; 280/5.509; 280/5.515; 701/37

(58) Field of Classification Search .......... 280/124.106, 280/124.107, 124.152, 124.157, 5.5, 5.502, 280/5.507, 5.509, 5.515; 701/37, 38
See application file for complete search history.

(56) References Cited

U.S. PATENT DOCUMENTS

| | | | |
|---|---|---|---|
| 3,550,992 A * | 12/1970 | Grancon | 280/6.157 |
| 3,709,517 A * | 1/1973 | Wossner | 280/104 |
| 4,796,911 A * | 1/1989 | Kuroki et al. | 280/5.511 |
| 4,805,929 A | 2/1989 | Shibata et al. | |
| 5,101,355 A | 3/1992 | Wada et al. | |
| 7,275,750 B2 * | 10/2007 | Suchta et al. | 280/5.511 |

(Continued)

FOREIGN PATENT DOCUMENTS
DE    41 36 262    5/1993

(Continued)

*Primary Examiner* — Paul N Dickson
*Assistant Examiner* — Joseph Rocca
(74) *Attorney, Agent, or Firm* — Oblon, Spivak, McClelland, Maier & Neustadt, L.L.P.

(57) ABSTRACT

A suspension system for a vehicle including: a stabilizer apparatus configured to change a stabilizer force by an operation of an actuator, a pair of hydraulic shock absorbers configured to change damping coefficients thereof, and a control device which is configured to execute a body-roll damping control in which at least a part of the stabilizer force is controlled to act as a roll damping force having a magnitude in accordance with a roll speed of a body of the vehicle, which is configured to change, in the body-roll damping control, a degree of the magnitude of the roll damping force by the stabilizer force, and which is configured to control, under execution of the body-roll damping control, the damping coefficient of each absorber such that a component of the absorber force for damping roll of the vehicle body is controlled in accordance with the degree of the magnitude of the roll damping force by the stabilizer force, namely, such that the component of the absorber force becomes smaller in an instance where the degree of the magnitude of the roll damping force by the stabilizer force is high than in an instance where the degree of the magnitude of the roll damping force by the stabilizer force is low.

28 Claims, 11 Drawing Sheets

U.S. PATENT DOCUMENTS

| | | | |
|---|---|---|---|
| 7,637,513 B2 * | 12/2009 | Kotulla et al. | 280/124.106 |
| 2004/0090019 A1 * | 5/2004 | Germain | 280/5.502 |
| 2008/0262690 A1 | 10/2008 | Hidaka et al. | |
| 2010/0013174 A1 * | 1/2010 | Buma et al. | 280/5.507 |

FOREIGN PATENT DOCUMENTS

| | | |
|---|---|---|
| DE | 44 33 142 | 4/1995 |
| DE | 10 2004 055177 | 5/2006 |
| EP | 0 270 327 | 6/1988 |
| EP | 1 985 478 | 10/2008 |
| FR | 2 894 880 | 6/2007 |
| JP | 64 22615 | 1/1989 |
| JP | 2001 1736 | 1/2001 |
| JP | 2005 238972 | 9/2005 |
| JP | 2006 256368 | 9/2006 |
| JP | 2006 256539 | 9/2006 |
| JP | 2007 30574 | 2/2007 |
| JP | 2007 83853 | 4/2007 |
| JP | 2007 196797 | 8/2007 |
| WO | 2007 114018 | 10/2007 |

\* cited by examiner

EXTENSION SIDE | CONTRACTION SIDE

FIG.7
(a)
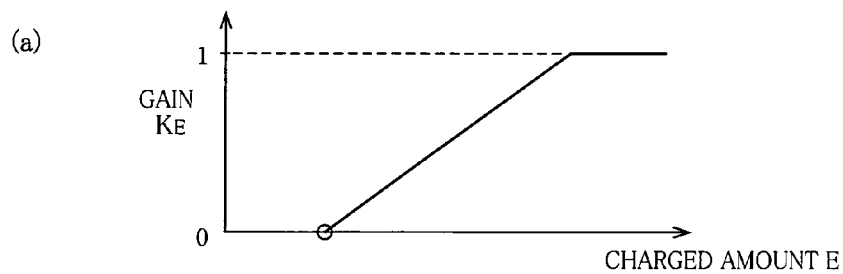
(b)
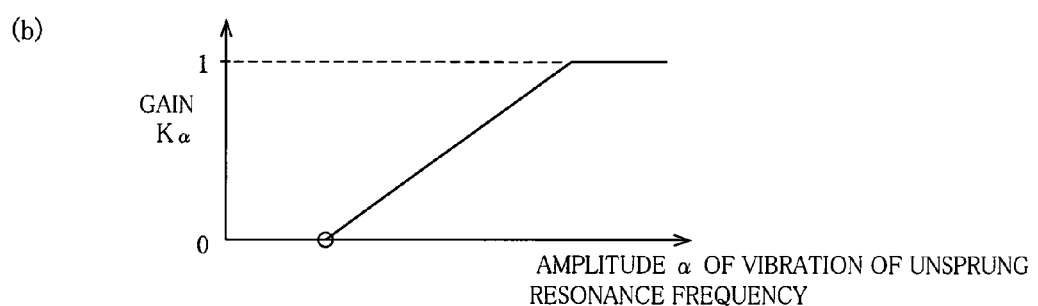
(c)
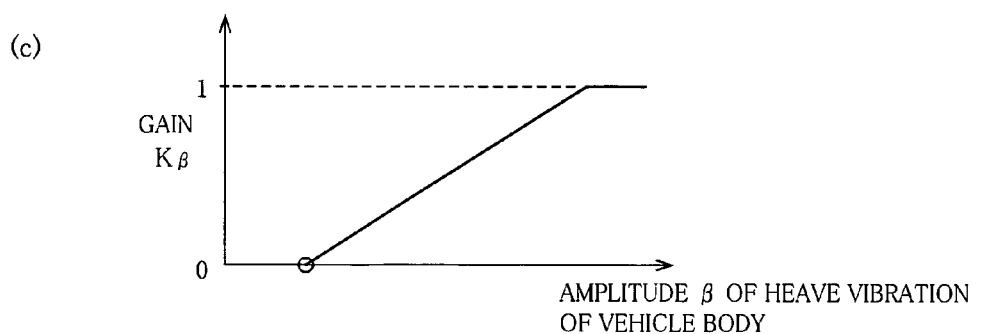

SUSPENSION SYSTEM FOR VEHICLE

TECHNICAL FIELD

The present invention relates in general to a suspension system for a vehicle including a stabilizer apparatus configured such that a stabilizer force generated by the stabilizer apparatus is changeable by an operation of an actuator.

BACKGROUND ART

In recent years, there has been developed and actually used a stabilizer system for a vehicle described in the following patent documents, namely, a stabilizer system including a stabilizer apparatus configured to controllably generate a stabilizer force that is based on a twist-reacting force of a stabilizer bar. Here, the twist-reacting force means a force exerted by the stabilizer bar as a result of being twisted.

| Patent Document 1 | JP-A-2005-238972 |
| Patent Document 2 | JP-A-2006-256539 |
| Patent Document 3 | JP-A-2007-83853 |

DISCLOSURE OF THE INVENTION

(A) Summary of the Invention

The vehicle suspension system described in each of the above-indicated Patent Documents is capable of restraining or suppressing roll of a vehicle body by applying a stabilizer force generated by the stabilizer apparatus as a roll restraining force. In the systems described in the above-indicated Patent Documents 1 and 2, the roll of the vehicle is restrained by controlling only the stabilizer force. The system described in the above-indicated Patent Document 3 includes, in addition to the stabilizer apparatus, a hydraulic shock absorber (hereinafter abbreviated as "absorber" where appropriate) configured to change a damping coefficient, and the roll of the vehicle body is restrained by controlling not only the stabilizer force but also the damping coefficient of the absorber. The suspension system equipped with the stabilizer apparatus which is configured to controllably generate the stabilizer force and the hydraulic absorber in which the damping coefficient is changeable is still under development, and there is plenty of room for improvement in a manner of controlling the stabilizer force and the damping coefficient. Accordingly, the utility of the system can be enhanced, by various modifications. The present invention has been developed in the situations described above, and it is therefore an object of the invention to provide a suspension system for a vehicle with high utility.

To achieve the object indicated above, a suspension system for a vehicle according to the present invention is arranged to have a stabilizer apparatus configured to change a stabilizer force by an operation of an actuator, a pair of shock absorbers of a hydraulic type configured to change damping coefficients thereof, and a control device configured to execute a body-roll damping control in which at least a part of the stabilizer force is controlled to act as a roll damping force having a magnitude in accordance with a roll speed of a body of the vehicle. Further, the control device is configured to change, in the body-roll damping control, a degree of the magnitude of the roll damping force by the stabilizer force and is configured to control, under execution of the body-roll damping control, the damping coefficient of each of the pair of shock absorbers such that a component of the absorber force which is generated by said each of the pair of shock absorbers and which is for damping roll of the body of the vehicle is controlled in accordance with a degree of the magnitude of the roll damping force by the stabilizer force, namely, such that the component of the absorber force becomes smaller in an instance where the degree of the magnitude of the roll damping force by the stabilizer force is high than in an instance where the degree of the magnitude of the roll damping force by the stabilizer force is low.

In the suspension system according to the present invention, the roll of the vehicle body is suppressed by damping the movement of the vehicle body in the roll direction owing to cooperation of the stabilizer apparatus and the absorbers. In the present system, the degree of the magnitude of the roll damping force by the stabilizer force is changeable. As explained below, the characteristics of the suspension system as to property of transmission of vibrations to a sprung portion, power saving property of the system, etc., differ depending upon whether the degree of the magnitude of the roll damping force by the stabilizer force is made high or low. Accordingly, in the present system, the degree of the magnitude of the roll damping force by the stabilizer force can be changed depending upon various situations so as to take advantage of the characteristics of the system, thereby improving the utility of the system.

(B) Forms of Claimable Invention

There will be explained various forms of an invention which is considered claimable (hereinafter referred to as "claimable invention" where appropriate). Each of the forms of the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of various forms and preferred embodiments. It is to be further understood that any form in which one or more elements is/are added to or deleted from any one of the following forms may be considered as one form of the claimable invention. The following forms (1)-(11) correspond to claims 1-11, respectively.

(1) A suspension system for a vehicle, comprising:

a stabilizer apparatus which includes: (a) a stabilizer bar whose opposite ends are connected respectively to an unsprung portion on a left-wheel side of the vehicle and an unsprung portion on a right-wheel side of the vehicle and which generates, on the basis of a twist-reacting force thereof, a stabilizer force by which a distance between a sprung portion and the unsprung portion on the left-wheel side and a distance between a sprung portion and the unsprung portion on the right-wheel side are changed relative to each other; and (b) an actuator configured to change the stabilizer force by an operation thereof;

a pair of shock absorbers of a hydraulic type each of which is provided between the sprung portion and the unsprung portion on a corresponding one of the left-wheel side and the right-wheel side and each of which generates an absorber force as a damping force with respect to a relative movement of the sprung portion and the unsprung portion on the corresponding one of the left-wheel side and the right-wheel side toward or away from each other, the pair of shock absorbers respectively including damping-coefficient changing mechanisms each configured to change a damping coefficient that is an ability to generate the absorber force and that is a basis of a magnitude of the absorber force to be generated; and a control device which is configured to control the stabilizer force of the stabilizer apparatus by controlling the operation of the actuator of the stabilizer apparatus and which is configured to control the damping-coefficient changing mechanisms of the pair of shock absorbers, wherein the control device is configured to execute a body-roll damping control in which at least a part of the stabilizer force is controlled to act as a roll damping force having a magnitude in accordance with a roll speed of a body of the vehicle, and wherein the control device is configured to change, in the body-roll damping control, a degree of the magnitude of the roll damping force by the stabilizer force and is configured to control, under execution of the body-roll damping control, the damping coefficient of each of the pair of shock absorbers such that a component of the absorber force which is generated by said each of the pair of shock absorbers and which is for damping roll of the body of the vehicle becomes smaller in an instance where the degree of the magnitude of the roll damping force by the stabilizer force is high than in an instance where the degree of the magnitude of the roll damping force by the stabilizer force is low.

The suspension system according to the above form (1) is capable of suppressing the roll of the vehicle body by damping the movement of the vehicle body in the roll direction owing to cooperation of the stabilizer apparatus and the absorbers. Further, the present suspension system is capable of changing the degree of the magnitude of the roll damping force by the stabilizer force. The roll damping force described in the form (1) is not a force to directly reduce an amount of the roll of the vehicle body, but a force to suppress the roll speed of the vehicle body. That is, the roll damping force described in the form (1) is a force to damp a relative movement of the vehicle body on a left side and on a right side of the vehicle body, namely, a force to damp the movement of the vehicle body in the roll direction.

The "degree of the magnitude of the roll damping force" described in the form (1) is indicative of a magnitude of the stabilizer force for damping the roll of the vehicle body and represented by a control gain for the roll damping force having a magnitude in accordance with the roll speed of the vehicle body, a roll damping coefficient set to determine the roll damping force, for instance. The "component of the absorber force for damping roll of the body of the vehicle" described in the form (1) is a force to be generated by each of the pair of absorbers against the movement of the vehicle body in the roll direction. In other words, the arrangement according the form (1) is capable of changing weighting between the stabilizer force for damping the roll of the vehicle body and the absorber force for damping the roll of the vehicle body. In an extreme sense, it is possible to damp the roll of the vehicle body mainly by the stabilizer force while, on the contrary, it is possible to damp the roll of the vehicle body mainly by the absorber force. Where the roll of the vehicle body is damped mainly by the stabilizer force, it is possible to generate the stabilizer force having a desired magnitude owing to the operation of the actuator, whereby the roll of the vehicle body can be effectively damped. However, where the actuator is configured to be operated by an electric power supplied thereto, it is necessary to take into account power consumption by the actuator. On the other hand, while it is not necessary to take account power consumption where the roll of the vehicle body is damped mainly by the absorber force, there may be a risk that a vibration in a relatively high frequency range tends to be transmitted to the sprung portion when the damping coefficient is increased to increase the absorber force.

As described above, the characteristics of the system differ depending upon whether the roll of the vehicle body is damped mainly by the stabilizer force or mainly by the absorber force. In the present system, where a certain magnitude of the roll damping force is generated, it is possible to change a ratio between the stabilizer force for damping the roll of the vehicle body and the absorber force for damping the roll of the vehicle. Further, it is possible to change a ratio of the stabilizer force with respect to the damping force required to damp the roll of the vehicle body and a ratio of the absorber force with respect to the damping force required to damp the roll of the vehicle body, in inverse relation to each other. According to the form (1), the degree of the magnitude of the roll damping force by the stabilizer force can be changed depending upon various situations so as to make good use of the characteristics of the system, thereby improving the utility of the suspension system.

The "roll speed of the body of the vehicle" described in the form (1) may be a roll speed of the vehicle body relative to a horizontal plane as explained below, and more specifically, may be derived from a relative displacement speed of the sprung portion on the left-wheel side and the sprung portion on the right-wheel side. Further, the "roll speed of the body of the vehicle" may be a roll speed of the vehicle body relative to a road surface on which vehicle runs, and more specifically, may be derived from a difference between: a relative speed of the sprung portion and the unsprung portion on the left-wheel side; and a relative speed of the sprung portion and the unsprung portion on the right-wheel side.

The structure of the "stabilizer apparatus" described in the above form (1) is not particularly limited. As explained below, the stabilizer apparatus may have a structure in which a stabilizer bar is constituted by a pair of stabilizer bar members obtained by dividing the stabilizer bar in two at its middle portion and the actuator disposed between the pair of stabilizer bar members permit the pair of stabilizer bar members to rotate relative to each other, thereby twisting the stabilizer bar. Further, the stabilizer apparatus may have a structure in which the actuator disposed between one end of the stabilizer bar and a wheel-holding member changes a distance between the above-indicated one end and the wheel-holding member, thereby twisting the stabilizer bar.

The structure of the "shock absorber" described in the above form (1) is not particularly limited. There may be employed an absorber of a hydraulic type conventionally used. The "damping-coefficient changing mechanism" described in the above form (1) may be configured to change the damping coefficient continuously or in steps among two or more pre-set values.

(2) The suspension system according to the form (1), wherein the control device is configured such that, in the body-roll damping control, the degree of the magnitude of the roll damping force by the stabilizer force becomes higher in an instance where an intensity of a vibration of an unsprung resonance frequency is high than in an instance where the intensity of the vibration of the unsprung resonance frequency is low.

In the above form (2), the degree of the magnitude of the roll damping force by the stabilizer force is changed utilizing, as a parameter, the intensity of the vibration of the unsprung resonance frequency. The value of the damping coefficient of the absorber influences the property of transmission of the vibration to the sprung portion. Where the vibration in the relatively high frequency range is concerned, the vibration transmission property to the sprung portion becomes higher with an increase in the damping coefficient. Accordingly, the value of the damping coefficient of the absorber is preferably made small when the property of transmission of the vibration in the relatively high frequency range to the sprung portion is taken into consideration. In the form (2), when the intensity of the vibration in the relatively high frequency range is high, the degree of the magnitude of the roll damping force by the stabilizer force can be made high while the component of the absorber force for damping the roll of the vehicle body can be made small. That is, in damping the roll of the vehicle body, the value of the damping coefficient of the absorber can be made small where the intensity of the vibration in the relatively high frequency range is high. According to the form (2), the transmission of the vibration in the relatively high frequency range to the sprung portion can be suppressed, thereby improving the ride comfort of the vehicle as felt by vehicle passengers.

In the above form (2), the judgment whether the intensity of the vibration of the unsprung resonance frequency is high or not is made based on not only the vibration of the unsprung resonance frequency per se, but also a vibration in the unsprung resonance frequency range, namely, a vibration in a frequency range extending from the unsprung resonance frequency, e.g., a vibration in a range of ±3 Hz from the unsprung resonance frequency. Where the judgment is made based on the vibration in the unsprung resonance frequency range, the judgment may be made based on an average value of the intensity of the vibration in the unsprung resonance frequency range or a maximum value of the intensity of the vibration in the unsprung resonance frequency range. The "intensity of a vibration" described in the form (2) indicates a component of the vibration. As the intensity of the vibration, it is possible to employ an amplitude, acceleration, or the like, of the vibration.

(3) The suspension system according to the form (1) or (2), wherein the actuator includes an electromagnetic motor as a power source and is operated by a force generated by the electromagnetic motor, and wherein the control device is configured such that, in the body-roll damping control, the degree of the magnitude of the roll damping force by the stabilizer force becomes lower in an instance where a charged amount of a battery that is a supply source of an electric power to the electromagnetic motor is smaller than in an instance where the charged amount of the battery is large.

In the above form (3), the degree of the magnitude of the roll damping force by the stabilizer force is changed utilizing, as a parameter, the charged amount of the battery. In the stabilizer apparatus according to the form (3), the stabilizer force can be changed in accordance with the roll speed of the vehicle body by controlling the operation of the electromagnetic motor, whereby the roll of the vehicle body can be effectively damped. It is, however, necessary to take account of power consumption by the electromagnetic motor. According to the form (3), in an instance where the charged amount of the battery is small, the component of the absorber force for damping the roll of the vehicle body can be made large while the degree of the magnitude of the roll damping force by the stabilizer force can be made lowered. Therefore, the form (3) realizes the system that ensures power savings.

(4) The suspension system according to any one of the forms (1)-(3), wherein the control device is configured such that, in the body-roll damping control, the degree of the magnitude of the roll damping force by the stabilizer force becomes higher in an instance where an intensity of at least one of a heave vibration of the body of the vehicle and a pitch vibration of the body of the vehicle is high than in an instance where the intensity of the at least one of the heave vibration of the body of the vehicle and the pitch vibration of the body of the vehicle is low.

In the above form (4), the degree of the magnitude of the roll damping force by the stabilizer force is changed utilizing, as a parameter, the intensity of at least one of the heave vibration and the pitch vibration, of the vehicle body. Because the stabilizer force is defined as a force by which a distance between the sprung portion and the unsprung portion on the left-wheel side and a distance between the sprung portion and the unsprung portion on the right-wheel side are changed relative to each other, the vibration of the vehicle body in the roll direction can be damped by the stabilizer force but a vibration of the vehicle body in a vertical direction, i.e., a vibration in a heave direction, and a vibration in a pitch direction cannot be damped by the stabilizer force. On the other hand, the absorber force is controlled for each wheel, whereby the vibration of the vehicle body in the heave direction and the vibration of the vehicle body in the pitch direction can be damped by the absorber force, in addition to the vibration of the vehicle body in the roll direction. However, there is a limit in the absorber force that can be generated by each absorber. In the light of this, in an instance where the intensity of at least one of the vibration in the heave direction and the vibration in the pitch direction is high, those vibrations, namely, the vibrations of the vehicle body except the vibration in the roll direction, are preferably dealt with by the absorber force while the vibration in the roll direction is preferably dealt with mainly by the stabilizer force. According to the form (4), therefore, where the intensity of the vibrations of the vehicle body except the vibration in the roll direction is high, the degree of the magnitude of the roll damping fore by the stabilizer force can be made high while the component of the absorber force to damp the roll of the vehicle body can be made small. Accordingly, the above form (4) is capable of increasing a component of the absorber force for damping the heave and the pitch of the vehicle body, for instance.

The "heave vibration" described in the above form (4) is a component of the vibration of the vehicle body regarding a translational movement in the vertical direction, and the "pitch vibration" is a component of the vibration of the vehicle body regarding a movement about a lateral axis of the vehicle body. The intensity of the heave vibration and the intensity of the pitch vibration can be estimated from sprung vertical accelerations, spring-portion absolute speeds, of the respective four sprung portions corresponding to the four wheels. The intensity of the vibration is represented by an amplitude of the vibration, a maximum acceleration of the vibration, and the like, for instance.

(5) The suspension system according to any one of the above forms (1)-(4), wherein the control device is configured such that, in the body-roll damping control, the degree of the magnitude of the roll damping force by the stabilizer force becomes higher in an instance where a running speed of the vehicle is high than in an instance where the running speed of the vehicle is low.

In the above form (5), the degree of the magnitude of the roll damping force by the stabilizer force is changed utilizing, as a parameter, the running speed of the vehicle. The running speed of the vehicle has a close relationship with a power spectral density indicative of a degree of unevenness or irregularities of the road surface. The power spectral density tends to increase with an increase in the running speed of the vehicle. Accordingly, the vehicle body is likely to undergo a vibration in a relatively low frequency range generated due to the road surface irregularities, with an increase in the running speed of the vehicle. As a result, the intensity of the heave vibration and the intensity of the pitch vibration tend to become high. According to the form (5), in an instance where the intensity of at least one of the heave vibration and the pitch vibration is assumed to be high, it is possible to deal with the heave vibration and the pitch vibration by the absorber force and to deal with the roll vibration mainly by the stabilizer force.

(6) The suspension system according to any one of the forms (1)-(5), wherein the control device is configured to control, in the body-roll damping control, the at least a part of the stabilizer force to act as a roll damping force having a magnitude in accordance with a roll speed of the vehicle body relative to a horizontal plane.

In the above form (6), the roll of the vehicle body is damped based on a so-called skyhook damper theory. The "roll speed of the vehicle body" described in the form (6) may be a relative displacement speed of the sprung portion on the left-wheel side and the sprung portion on the right-wheel side, namely, a difference between a sprung-portion absolute speed on the left-wheel side and a sprung-portion absolute speed on the right-wheel side, for instance. Further, the roll speed of the vehicle body in the form (6) may be a roll angular speed of the vehicle body, namely, a speed of change of an inclination angle of a straight line connecting the sprung portions on the left-wheel side and on the right-wheel side, relative to a horizontal plane.

(7) The suspension system according to the form (6), wherein a damping force which is required to damp a movement of each of the sprung portions and which has a magnitude in accordance with a sprung-portion absolute speed that is a speed of the movement of said each of the sprung portions is defined as a required sprung damping force while a damping force with respect to the movement of said each of the sprung portions that depends on the roll damping force by the stabilizer force is defined as a stabilizer-force-dependent sprung damping force, and wherein the control device is configured to control, under execution of the body-roll damping control, the damping coefficient of said each of the pair of shock absorbers such that the absorber force generated by said each of the pair of shock absorbers becomes equal to a difference between the required sprung damping force of said each of the pair of shock absorbers and the stabilizer-force-dependent sprung damping force.

In the above form (7), the vibration of the sprung portion is damped by cooperation of the stabilizer apparatus and the absorbers. In other words, the stabilizer apparatus generates a part of the damping force with respect to the component of the vibration of the sprung portion in the roll direction, as the above-indicated stabilizer-force-dependent sprung damping force while each absorber generates a force corresponding to a difference obtained by subtracting the stabilizer-force-dependent sprung damping force from the above-indicated required sprung damping force, thereby damping the vibration of the sprung portion. According to the form (7), the required sprung damping force can be generated by the stabilizer force and the absorber force, so that the sprung portion can be effectively damped.

(8) The suspension system according to the form (7), wherein the control device is configured such that the damping coefficient of said each of the pair of shock absorbers that is changed by each of the damping-coefficient changing mechanisms becomes equal to a minimum one of predetermined damping coefficients when the sprung portion and the unsprung portion of said each of the pair of shock absorbers move toward or away from each other in a direction of the damping force generated by said each of the pair of shock absorbers.

Though each of the hydraulic absorbers can generate a resistance force against the movement of the sprung portion and the unsprung portion toward or away from each other, it cannot generate a force for positively moving the sprung portion and the unsprung portion toward or away from each other, i.e., a propulsive force. Accordingly, when the sprung portion and the unsprung portion move toward or away from each other in a direction in which the absorber force should be generated, the absorber cannot generate the absorber force in the required direction. In such an instance, the absorber generates the absorber force in a direction opposite to the required direction, thereby causing a risk that the absorber force hinders the sprung portion from being damped. According to the form (8), the absorber force can be made as small as possible where the absorber force may hinder damping of the sprung portion.

(9) The suspension system according to any one of the forms (1)-(8), wherein the control device is configured to execute, also under execution of the body-roll damping control, a body-roll-amount reducing control for reducing a roll amount of the body of the vehicle by controlling a part of the stabilizer force to become a force having a magnitude in accordance with roll moment that the body of the vehicle undergoes due to turning of the vehicle.

The above form (9) realizes an intrinsic or original function of the stabilizer apparatus, namely, a function of reducing the roll amount of the vehicle body generated due to turning of the vehicle. According to the form (9), the body-roll damping control and the body-roll-amount reducing control can be simultaneously executed. Therefore, even if the roll of the vehicle body is generated due to different causes, the roll of the vehicle body can be appropriately coped with. Where the body-roll damping control and the body-roll-amount reducing control are simultaneously executed, the stabilizer apparatus generates the stabilizer force as a force for reducing the roll amount of the vehicle body, in addition to the stabilizer force as the roll damping force.

(10) The suspension system according to any one of the forms (1)-(9), wherein the stabilizer bar is constituted by a pair of stabilizer bar members each of which includes a torsion bar portion disposed so as to extend in a width direction of the vehicle and an arm portion which extends continuously from the torsion bar portion so as to intersect the torsion bar portion and which is connected at a leading end portion thereof to a wheel-holding portion that holds a corresponding one of left and right wheels, and wherein the actuator is configured to rotate the torsion bar portions of the pair of stabilizer bar members relative to each other.

In the above form (10), the structure of the stabilizer apparatus, more specifically, the structure of the stabilizer bar and the actuator, is limited. According to the above form (10), the stabilizer force generated by the stabilizer apparatus can be efficiently changed.

(11) The suspension system according to the form (10), wherein the actuator includes an electromagnetic motor as a power source, a decelerator which decelerates rotation of the electromagnetic motor, and a housing which holds the electromagnetic motor and the decelerator, and wherein the torsion bar portion of one of the pair of stabilizer bar members is connected to the housing so as to be unrotatable relative to the housing while the torsion bar portion of the other of the pair of stabilizer bar members is connected to an output portion of the decelerator so as to be unrotatable relative to the output portion.

In the above form (11), the structure of the actuator, the connection manner of the actuator and the stabilizer bar, and the dispositional relationship of the actuator and the stabilizer bar are specifically limited. The mechanism of the decelerator of the actuator in the form (11) is not particularly limited. There may be employed decelerators of various mechanisms such as a harmonic gear mechanism (called "HARMONIC DRIVE" (trademark) mechanism and also called "strain wave gear ring mechanism") and a hypocycloid decelerating mechanism. For downsizing the electromagnetic motor, it is preferable that the reduction ratio of the decelerator be relatively large. In this respect, the large reduction ratio means that the operational amount of the actuator with respect to the operation amount of the electromagnetic motor is small. In view of this, the decelerator that employs the harmonic gear mechanism is suitable in the system according to the above form (11).

BRIEF DESCRIPTION OF THE DRAWINGS

FIGS. 7(a)-7(c) are graphs showing gains each for determining stabilizer-force-dependent damping moment and absorber-force-dependent damping moment.

BEST MODE FOR CARRYING OUT THE INVENTION

Figure 1:
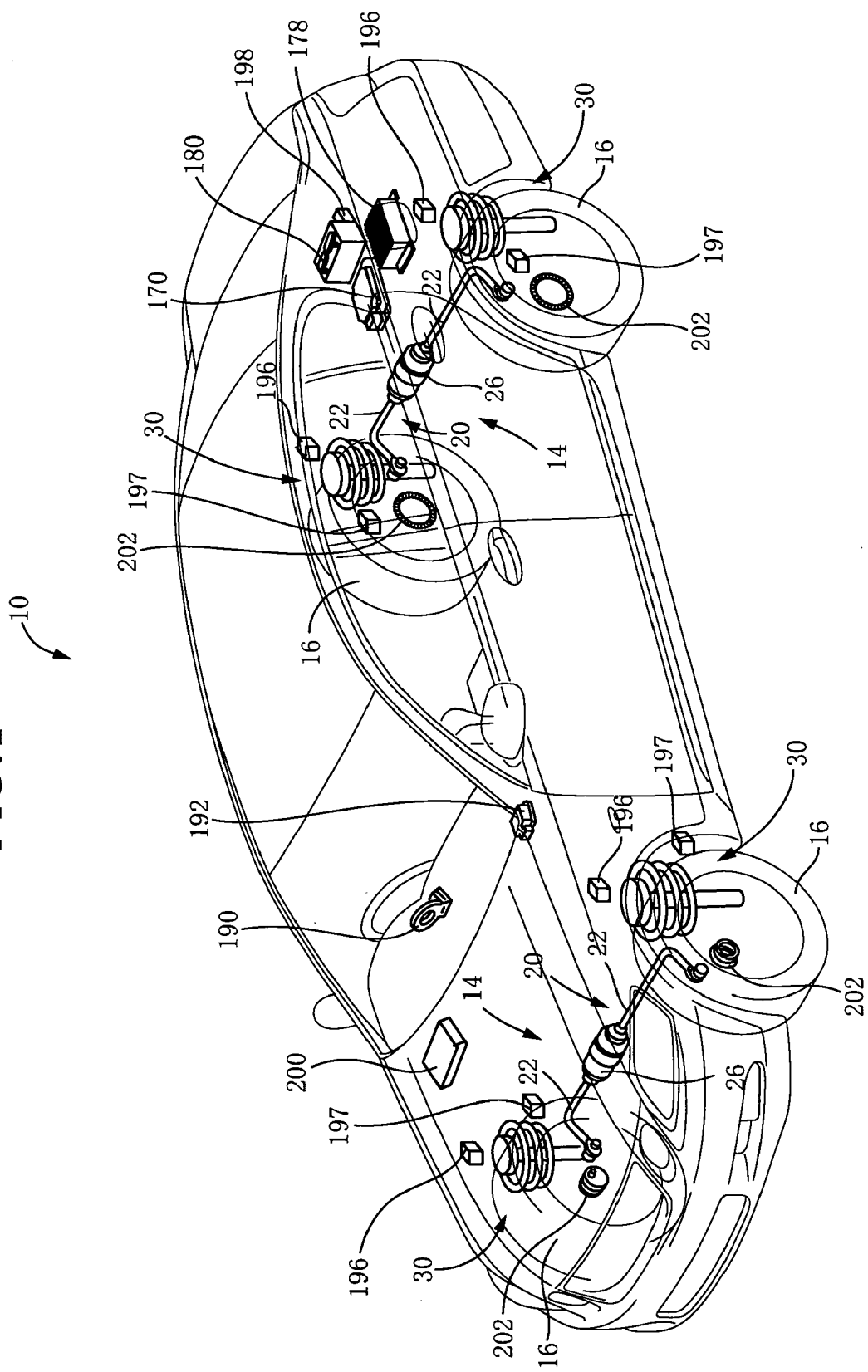
FIG. 1 is a schematic view showing an overall structure of a suspension system for a vehicle according to one embodiment of the claimable invention.

There will be described in detail one embodiment according to the claimable invention, referring to the drawings. It is to be understood, however, that the claimable invention is not limited to the details of the following embodiment but may be embodied with various changes and modifications, such as those described in the FORMS OF THE CLAIMABLE INVENTION, which may occur to those skilled in the art.

1. Structure of Suspension System 1.1. Overall Structure of Suspension System

FIG. 1 schematically shows a suspension system 10 for a vehicle according to the present embodiment. The suspension system 10 includes a pair of stabilizer apparatuses 14, 14 which are respectively disposed on a front-wheel side and a rear-wheel side, of the vehicle. Each stabilizer apparatus 14 includes a stabilizer bar 20 whose opposite ends are respectively connected to wheel-holding members in the form of suspension arms (FIGS. 2 and 3) for holding left and right wheels 16, respectively. The stabilizer bar 20 is divided into two portions so as to include a pair of stabilizer bar members 22, 22. The pair of stabilizer bar members 22, 22 are connected by an actuator 26 so as to be rotatable relative to each other.

Figure 2:
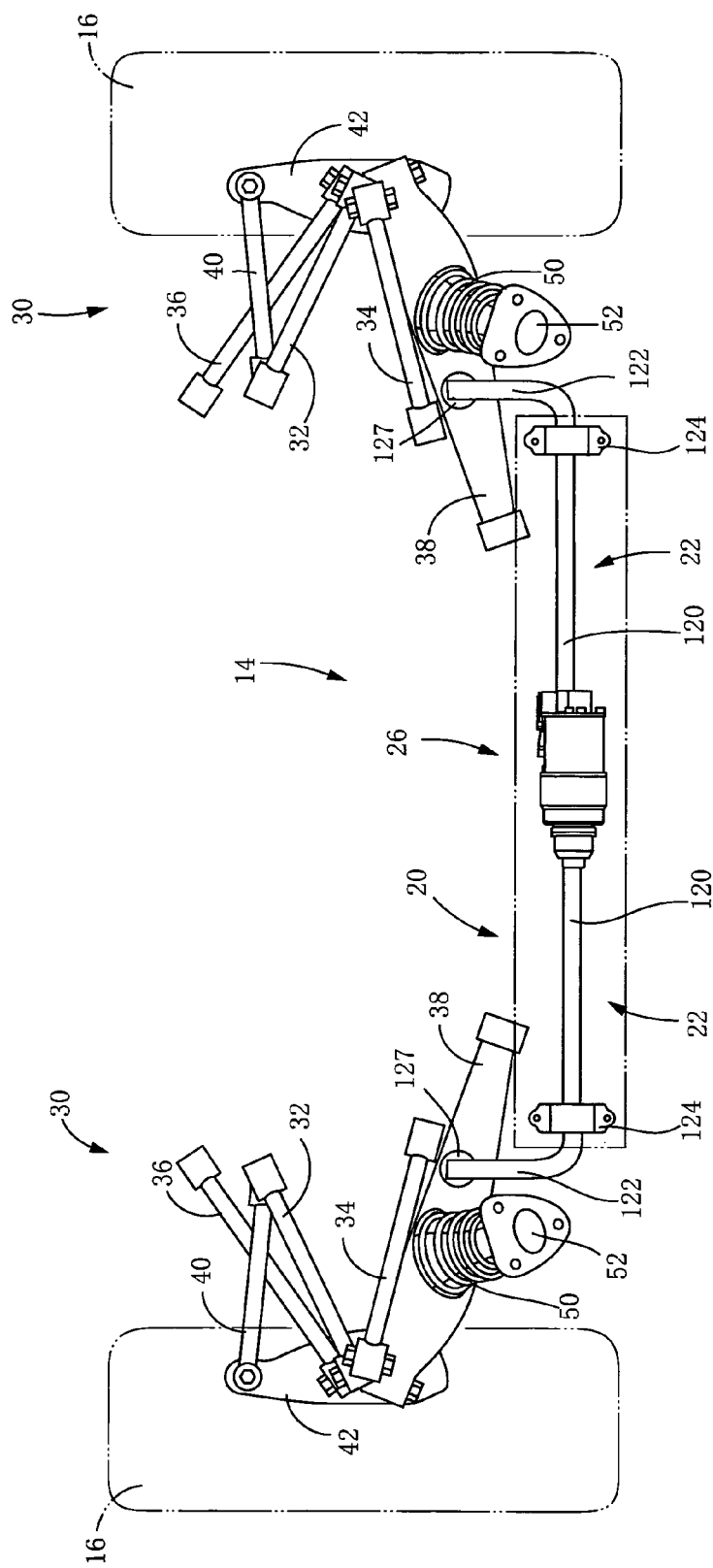
FIG. 2 is a schematic view showing a stabilizer apparatus and suspension apparatuses of the suspension system of FIG. 1, as viewed from above the vehicle.
Figure 3:
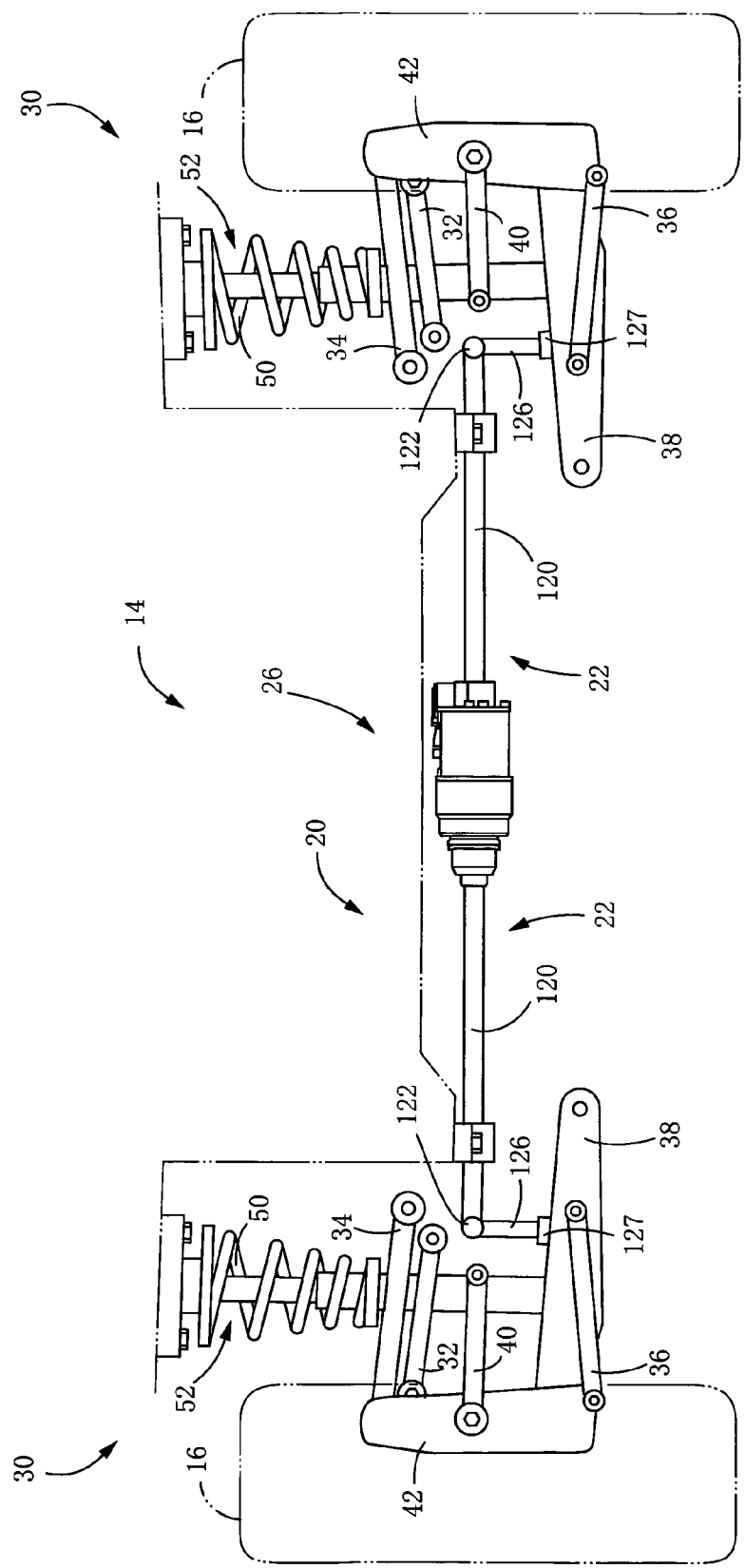
FIG. 3 is a schematic view showing the stabilizer apparatus and the suspension apparatuses of the suspension system of FIG. 1, as viewed from a front side of the vehicle.

In the vehicle on which the present suspension system 10 is mounted, four suspension apparatuses are disposed so as to correspond to the respective four wheels 16. Two of the four suspension apparatuses for the respective two front wheels that can be steered are substantially identical in construction with another two of the four suspension apparatuses for the respective two rear wheels that cannot be steered, except for a mechanism that enables the wheels to be steered. Accordingly, the suspension apparatuses for the rear wheels are explained for the sake of brevity. Each suspension apparatus generally indicated at 30 in FIGS. 2 and 3 is of an independent type and a multi link type. The suspension apparatus 30 includes a first upper arm 32, a second upper arm 34, a first lower arm 36, a second lower arm 38, and a toe control arm 40, each as the suspension arm. One end of each of the five arms 32, 34, 36, 38, 40 is rotatably connected to a body of the vehicle while the other end is rotatably connected to an axle carrier 42 which rotatably holds a corresponding one of the four wheels 16. Owing to the five arms 32, 34, 36, 38, 40, the axle carrier 42 is vertically movable relative to the vehicle body along a substantially constant locus. The suspension apparatus 30 includes a coil spring 50 and a hydraulic shock absorber (hereinafter abbreviated as "absorber" where appropriate) 52 which are disposed in parallel with each other between the second lower arm 38 as an unsprung portion and a mount portion 54 as a sprung portion that is provided in a tire housing.

1.2. Structure of Absorber

Figure 4:
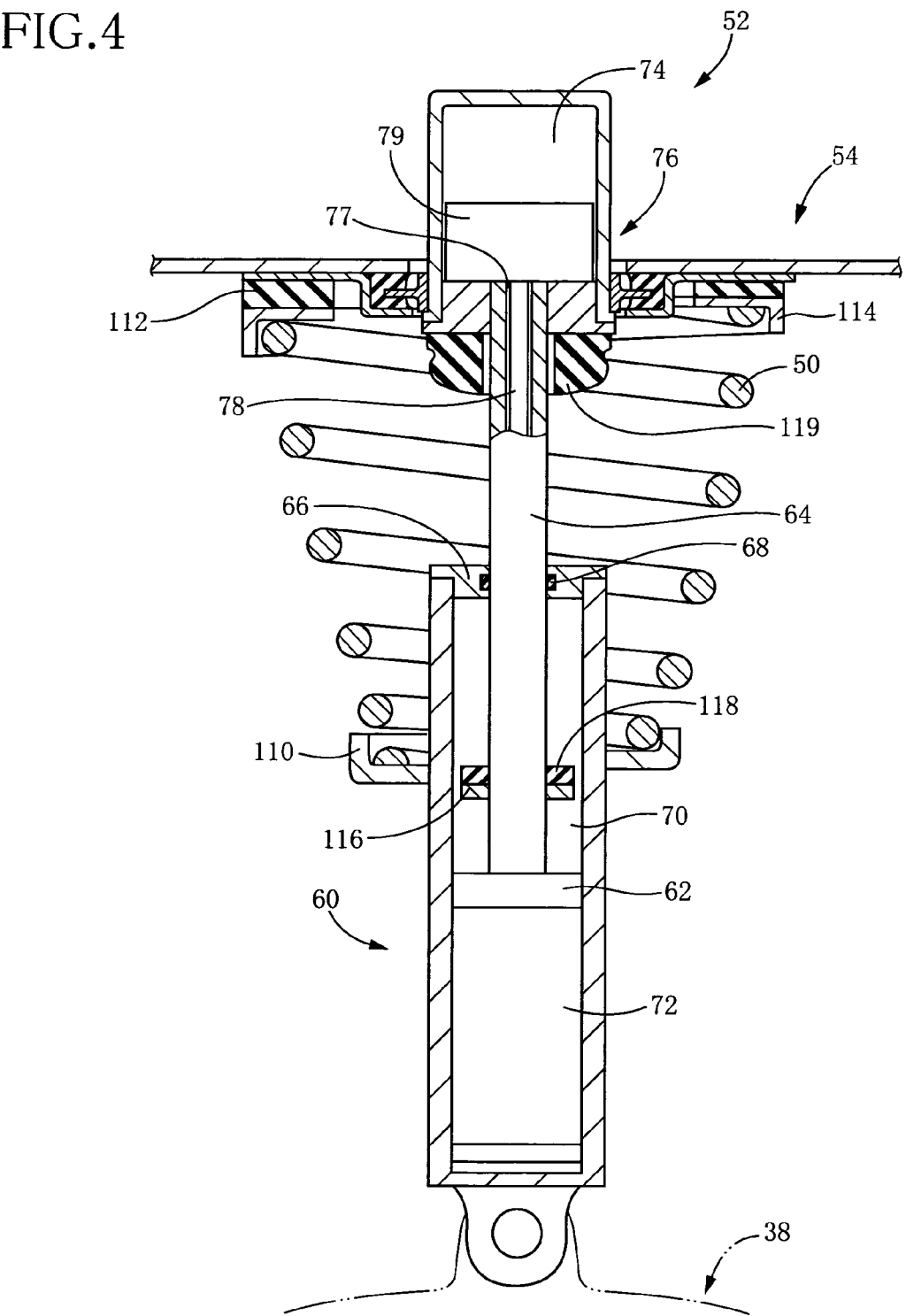
FIG. 4 is a cross sectional view of a hydraulic shock absorber of each suspension apparatus.

As shown in FIG. 4, the absorber 52 includes: a generally cylindrical housing 60 which is connected to the second lower arm 38 and which accommodates a working fluid; a piston 62 fluid-tightly and slidably fitted in an inside of the housing 60; and a piston rod 64 connected at its lower end to the piston 62 and extending, at its upper end, upward beyond the top of the housing 60. The piston rod 64 penetrates through a cap portion 66 disposed on the upper portion of the housing 60 and is held in sliding contact with the cap portion 66 via a seal 68. The inside of the housing 60 is divided into an upper chamber 70 located on an upper side of the piston 62 and a lower chamber 72 located on a lower side of the piston 62.

The absorber 52 further includes an electromagnetic motor 74 which is fixedly housed in a motor casing 76. The motor casing 76 is connected at its outer circumferential portion to the mount portion 54 via a cushion rubber. The piston rod 64 is fixedly connected at its upper end to the motor casing 76. Thus, the piston rod 64 is fixed with respect to the mount portion 54. The piston rod 64 is a hollow member and has a through-hole 77 which extends through an inside of the piston rod 64. As explained below in detail, an adjustment rod 78 is inserted into the through-hole 77 so as to be movable in an axis direction of the piston rod 64, namely, in an axis direction of the absorber 52. The adjustment rod 78 is connected at its upper end to the electromagnetic motor 74. More specifically explained, there is disposed, below the electromagnetic motor 74, a motion converting mechanism 79 for converting the rotation of the electromagnetic motor 74 into the movement of the adjustment rod 78 in the axis direction. The upper end of the adjustment rod 78 is connected to the motion converting mechanism 79. In this structure, the adjustment rod 78 is configured to be moved in the axis direction when the electromagnetic motor 74 is operated.

Figure 5:
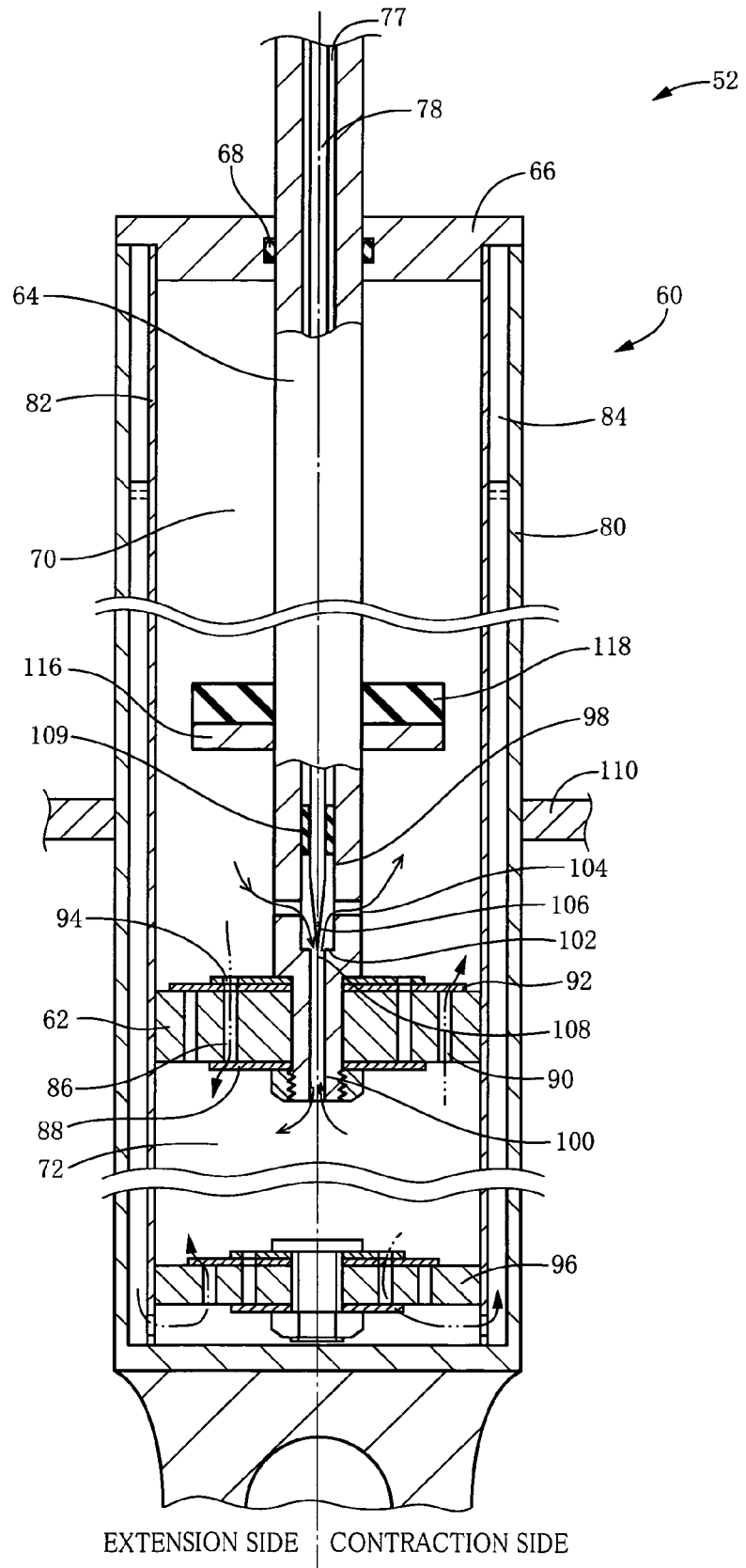
FIG. 5 is an enlarged cross sectional view of the shock absorber of FIG. 4.

As shown in FIG. 5, the housing 60 is comprised of an outer cylindrical member 80 and an inner cylindrical member 82 between which a buffer chamber 84 is formed. The piston 62 is fluid-tightly and slidably fitted in the inner cylindrical member 82. The piston 62 has a plurality of communication passages 86 (two of which are shown in FIG. 5) which are formed through the thickness of the piston 62 so as to extend in the axis direction and through which the upper chamber 70 and the lower chamber 72 communicate with each other. A disk-like valve plate 88 formed of an elastic material is disposed on a lower surface of the piston 62 so as to be held in contact with the lower surface. Openings of the communication passages 86 on the side of the lower chamber 72 are closed by the valve plate 88. The piston 62 further has a plurality of communication passages 90 (two of which are shown in FIG. 5) which are located apart from the above-indicated communication passages 86 in the radial direction. A disk-like valve plate 92 formed of an elastic material is disposed on an upper surface of the piston 62 so as to be held in contact with the upper surface. Openings of the communication passages 90 on the side of the upper chamber 70 are closed by the valve plate 92. Each communication passage 90 is located at a position which is radially outwardly of each communication passage 86 and which is outside the valve plate 88 in the radial direction. Accordingly, the communication passages 90 are normally kept in communication with the lower chamber 72. Openings of the communication passages 86 on the side of the upper chamber 70 are kept open, namely, are not closed, owing to openings 94 formed in the valve plate 92, whereby the communication passages 86 are normally kept in communication with the upper chamber 70. Further, the lower chamber 72 and the buffer chamber 84 are held in communication with each other, and there is disposed, between the lower chamber 72 and the buffer chamber 84, a base valve member 96 having communication passages and valve plates similar to those formed in the piston 62.

The through-hole 77 formed in the piston rod 64 includes a large-diameter portion 98 and a small-diameter portion 100 that extends downwardly from the large-diameter portion 98. A stepped surface 102 is formed at a boundary between the large-diameter and small-diameter portions 98, 100. Communication passages 104 that permit communication between the upper chamber 70 and the through-hole 77 are formed above the stepped surface 102. The upper chamber 70 and the lower chamber 72 are held in communication with each other by the communication passages 104 and the through-hole 77. The adjustment rod 78 is inserted into the large-diameter portion 98 of the through-hole 77 from the upper end of the piston rod 64. The lower end of the adjustment rod 78 is formed into a conical portion 106. The leading end of the conical portion 106 is insertable into the small-diameter portion 100 of the through-hole 77. Between the conical portion 106 and the stepped surface 102 of the through-hole 77, a clearance 108 is formed. It is noted that the outside diameter of the adjustment rod 78 is made larger than the inside diameter of the small-diameter portion 100 of the through-hole 77. At a portion of the through-hole 77 above the communication passages 104, a seal 109 is provided between the inner circumferential surface of the through-hole 77 and the outer circumferential surface of the adjustment rod 78, thereby preventing the working fluid from flowing into an upper portion of the through-hole 77.

In the structure described above, when the sprung portion and the unsprung portion are moved away from each other and the piston 62 is moved upward, namely, when the absorber 52 extends, a part of the working fluid in the upper chamber 70 flows into the lower chamber 72 through the communication passages 86 and the clearance 108 of the through-hole 77 while a part of the working fluid in the buffer chamber 84 flows into the lower chamber 72 through the communication passages of the base valve member 96. On this occasion, a resistance force is given to the upward movement of the piston 62 owing to the flow of the working fluid into the lower chamber 72 as a result of deflection of the valve plate 88 caused by the working fluid, owing to the flow of the working fluid into the lower chamber 72 as a result of deflection of the valve plate of the base valve member 96 caused by the working fluid, and owing to passage of the working fluid through the clearance 108 of the through-hole 77. Accordingly, there is generated, by the resistance force, a damping force with respect to the upward movement of the piston 62. On the other hand, when the sprung portion and the unsprung portion are moved toward each other and the piston 62 is moved downward in the housing 60, namely, when the absorber 52 contracts, a part of the working fluid in the lower chamber 72 flows into the upper chamber 70 through the communication passages 90 and the clearance 108 of the through-hole 77 while flowing into the buffer chamber 84 through the communication passages of the base valve member 96. On this occasion, a resistance force is given to the downward movement of the piston 62 owing to the flow of the working fluid into the upper chamber 70 as a result of deflection of the valve plate 92 caused by the working fluid, owing to the flow of the working fluid into the buffer chamber 84 as a result of deflection of the valve plate of the base valve member 96 caused by the working fluid, and owing to the passage of the working fluid through the clearance 108 of the through-hole 77. Accordingly, there is generated, by the resistance force, a damping force with respect to the downward movement of the piston 62. That is, the absorber 52 is configured to generate the damping force with respect to the relative movement of the sprung portion and the unsprung portion toward or away from each other.

As explained above, the adjustment rod 78 is movable in the axis direction by the operation of the electromagnetic motor 74 and is configured to change the size (the cross sectional area) of the clearance 108 of the through-hole 77. When the working fluid passes through the clearance 108, the resistance force is given to the upward or downward movement of the piston 62 as described above. The magnitude of the resistance force varies depending upon the size of the clearance 108. Therefore, the absorber 52 is configured to change a damping characteristic with respect to the relative movement of the sprung portion and the unsprung portion toward or away from each other, namely, to change a so-called damping coefficient, by moving the adjustment rod 78 in the axis direction owing to the operation of the electromagnetic motor 74 and thereby changing the size of the clearance 108. More specifically explained, the electromagnetic motor 74 is controlled such that its rotational angle is equal to a value which corresponds to the damping coefficient that the absorber 52 should have, thereby changing the damping coefficient of the absorber 52. In this regard, the absorber 52 is configured such that its damping coefficient is changeable so as to be selected from among damping coefficients in a range defined between a minimum damping coefficient $C_{min}$ and a maximum damping coefficient $C_{MAX}$.

An annular lower retainer 110 is provided on the outer circumferential portion of the housing 60 while an annular upper retainer 114 is attached to the underside of the mount portion 54 via a vibration damping rubber 112. The coil spring 50 is supported by the lower and upper retainers 110, 114 so as to be sandwiched therebetween. At a position of the outer circumferential portion of the piston rod 64 accommodated in the upper chamber 70, an annular member 116 is fixed. An annular cushion rubber 118 is attached to the upper surface of the annular member 116. A cylindrical cushion rubber 119 is attached to the lower surface of the motor casing 76. When the vehicle body and the wheel move relative to each other to a certain degree in a direction away from each other (hereinafter referred to as "rebound direction" where appropriate), the annular member 116 comes into contact with the lower surface of the cap portion 66 of the housing 60 via the cushion rubber 118. On the other hand, when the vehicle body and the wheel move relative to each other to a certain degree in a direction toward each other (hereinafter referred to as "bound direction" where appropriate), the upper surface of the cap portion 66 comes into contact with the lower surface of the motor casing 76 via the cushion rubber 119. In other words, the absorber 52 is equipped with stoppers, i.e., a bound stopper and a rebound stopper, with respect to the movements of the vehicle body and the wheel toward and away from each other, respectively.

1.3. Structure of Stabilizer Apparatus

As shown in FIGS. 2 and 3, each stabilizer bar member 22 of the stabilizer apparatus 14 includes a torsion bar portion 120 extending generally in the width direction of the vehicle and an arm portion 122 extending integrally from the torsion bar portion 120 generally in the frontward direction of the vehicle so as to intersect the torsion bar portion 120. The torsion bar portion 120 of each stabilizer bar member 22 is rotatably supported, at a position thereof near to the arm portion 122, by a holding member 124 fixedly disposed on the vehicle body. The torsion bar portions 120 of the respective stabilizer bar members 22 are disposed coaxially relative to each other. One end of each torsion bar portion 120 which is opposite to the other end thereof near to the arm portion 122 is connected to the actuator 26 as explained below in detail. One end of each arm portion 122 which is opposite to the other end thereof near to the torsion bar portion 120 is connected to the second lower arm 38 via a link rod 126. The second lower arm 38 is provided with a ling-rod connecting portion 127. One end of the link rod 126 is swingably connected to the link-rod connecting portion 127 while the other end thereof is swingably connected to the above-indicated one end of the arm portion 122.

Figure 6:
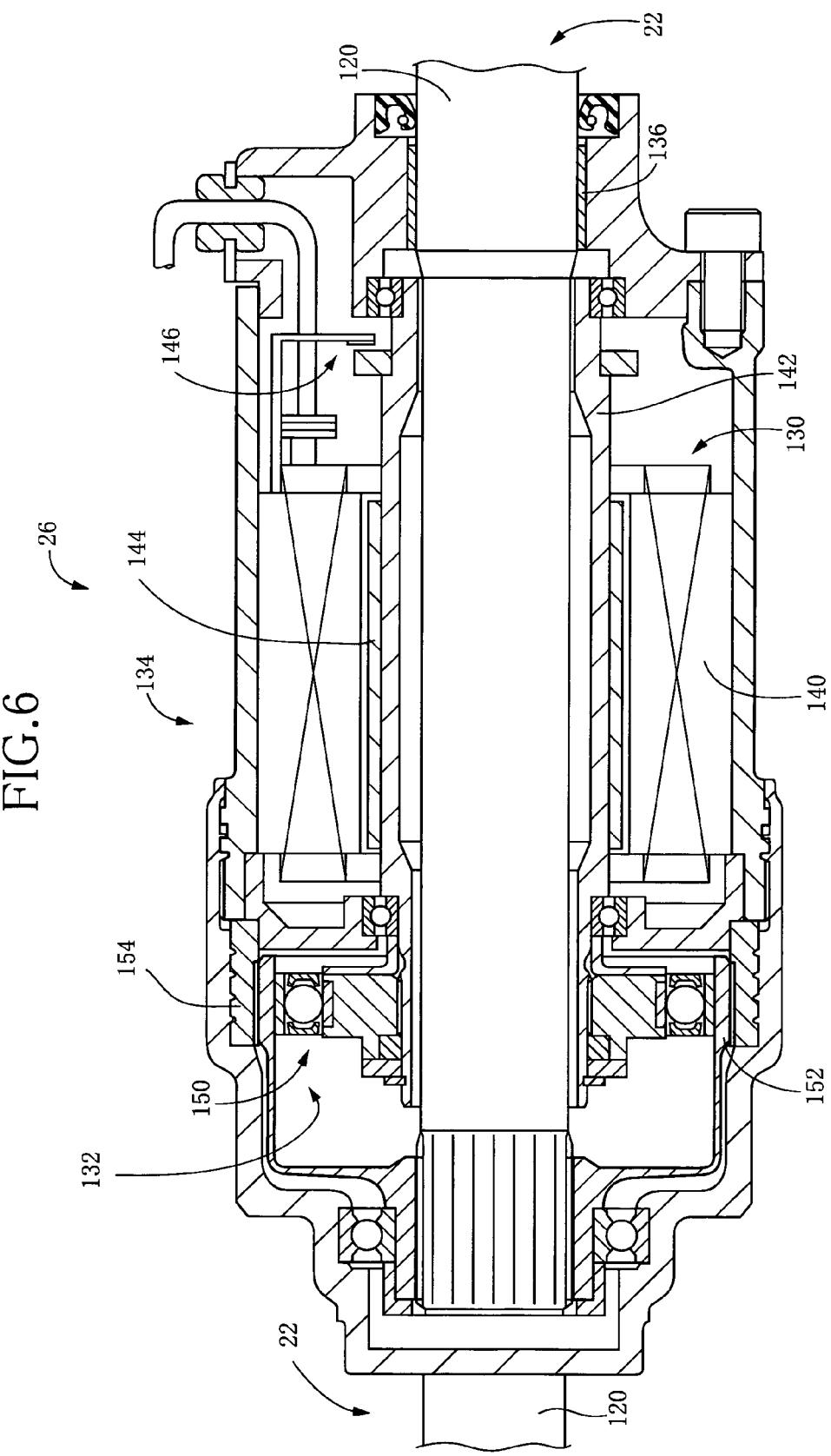
FIG. 6 is a cross sectional view of an actuator of the stabilizer apparatus.

As shown in FIG. 6, the actuator 26 of the stabilizer apparatus 14 includes an electromagnetic motor 130 as a drive source and a decelerator 132 configured to decelerate rotation of the electromagnetic motor 130. The electric motor 130 and the decelerator 132 are disposed in a housing 134 as an outer shell member of the actuator 26. The above-indicated one end of the torsion bar portion 120 of one of the pair of stabilizer bar members 22 is fixedly connected to one of opposite ends of the housing 134. The other of the pair of stabilizer bar members 22 is disposed so as to extend into the housing 134 at the other of the opposite ends of the housing 134 and is connected to the decelerator 132 as explained below in detail. Further, the other of the pair of stabilizer bar members 22 is rotatably held, at its axially intermediate portion, by the housing 134 via a bush bearing 136.

The electromagnetic motor 130 includes: a plurality of coils 140 fixedly disposed on one circumference along an inner circumferential surface of the cylindrical wall of the housing 134; a hollow motor shaft 142 rotatably held by the housing 134; and permanent magnets 144 fixedly disposed on the outer circumference of the motor shaft 142 so as to face the coils 140. The electric motor 130 is a motor in which the coils 140 function as a stator and the permanent magnets 144 function as a rotor, and is a three-phase DC brushless motor. In the housing 134, there is disposed a motor-rotational-angle sensor 146 for detecting a rotational angle of the motor shaft 142, namely, a rotational angle of the electromagnetic motor 130. The motor-rotational-angle sensor 146 is constituted principally by an encoder and utilized in the control of the actuator 26, namely in the control of the stabilizer apparatus 14.

In the present embodiment, the decelerator 132 is constituted as a harmonic gear mechanism (called "HARMONIC DRIVE (trademark) mechanism" and also called "strain wave gear ring mechanism") including a wave generator 150, a flexible gear 152, and a ring gear 154. The wave generator 150 includes an oval cam and ball bearings fitted on a periphery of the cam, and is fixed to one end of the motor shaft 142. The flexible gear 152 is a cup-like member whose cylindrical wall portion is elastically deformable. A plurality of teeth (400 teeth in the present decelerator 132) are formed on an outer circumference of the cylindrical wall portion at its open end. The flexible gear 152 is connected to and held by the above-indicated one end of the torsion bar portion 120 of the other of the pair of stabilizer bar members 22. More specifically, the torsion bar portion 120 of the other of the pair of stabilizer bar members 22 penetrates the motor shaft 142 and has an end portion extending from or beyond the one end of the motor shaft 142. To the outer circumferential surface of this end portion, a bottom portion of the flexible gear 152 as the output portion of the decelerator 132 is connected by spline fitting so as to be unrotatable relative to each other, with the end portion penetrating the bottom portion of the flexible gear 152. The ring gear 154 is a generally ring-like member and is fixed to the housing 134. A plurality of teeth (402 teeth in the present decelerator 132) are formed on an inner circumference of the ring gear 154. The flexible gear 152 is fitted at its cylindrical wall portion on the wave generator 150 and is elastically deformed into an oval shape. The flexible gear 152 meshes the ring gear 154 at two portions thereof corresponding to opposite ends of the long axis of the oval and does not mesh the same 154 at portions thereof other than the two portions. In the thus constructed decelerator 132, with one rotation of the wave generator 150 (i.e., after rotation of the wave generator 150 by 360°), in other words, after one rotation of the motor shaft 142 of the electromagnetic motor 130, the flexible gear 152 and the ring gear 154 are rotated relative to each other by an amount corresponding to the two teeth. That is, the reduction ratio of the decelerator 132 is made equal to 1/200.

In the thus constructed stabilizer apparatus 14, where the left and right stabilizer bar members 22, 22 are rotated relative to each other by the operation of the actuator 26, the arm portions 122, 122 of the respective stabilizer bar members 22, 22 are rotated relative to each other while the torsion bar portions 120, 120 of the respective stabilizer bar members 22, 22 are twisted, so that one of a distance between the sprung portion and the unsprung portion for the left wheel and a distance between the sprung portion and the unsprung portion for the right wheel is increased while the other of the distances is decreased. In other words, owing to the twist-reacting force of each torsion bar portion 120, the sprung portion and the unsprung portion for one of the left and right wheels are moved away from each other while the sprung portion and the unsprung portion for other of the left and right wheels are moved toward each other. That is, the stabilizer apparatus 14 generates a stabilizer force by which the distance between the sprung portion and the unsprung portion for the left wheel and the distance between the sprung portion and the unsprung portion for the right wheel are changed relative to each other. Further, the relative rotational amount of the left and right stabilizer bar members 22, 22 is changed by changing the rotational amount of the actuator 26, whereby the stabilizer force can be changed. In short, the stabilizer apparatus 14 is capable of controllably generate the stabilizer force.

Here, the rotational amount of the actuator 26 means the following: A state in which the vehicle is kept at rest on a flat road is defined as a basic state. Where the rotational position of the actuator 26 in the basic state is defined as a neutral position, the rotational amount of the actuator 26 indicates an amount of rotation, i.e., an amount of operation, from the neutral position. Accordingly, with an increase in the rotational amount of the actuator 26, the relative rotational amount of the left and right stabilizer bar members 22 increases, and the twist-reacting force of the stabilizer bar 20, namely, the stabilizer force, accordingly increases. Since there is correspondence relationship between the rotational amount of the actuator 26 and the rotational angle of the electromagnetic motor 130, there is executed, in the control of the present system 10, a control which is targeted at the motor rotational angle obtained by the motor-rotational-angle sensor 146, in place of the rotational amount of the actuator 26.

1.4. Structure of Control Device

Figure 11:
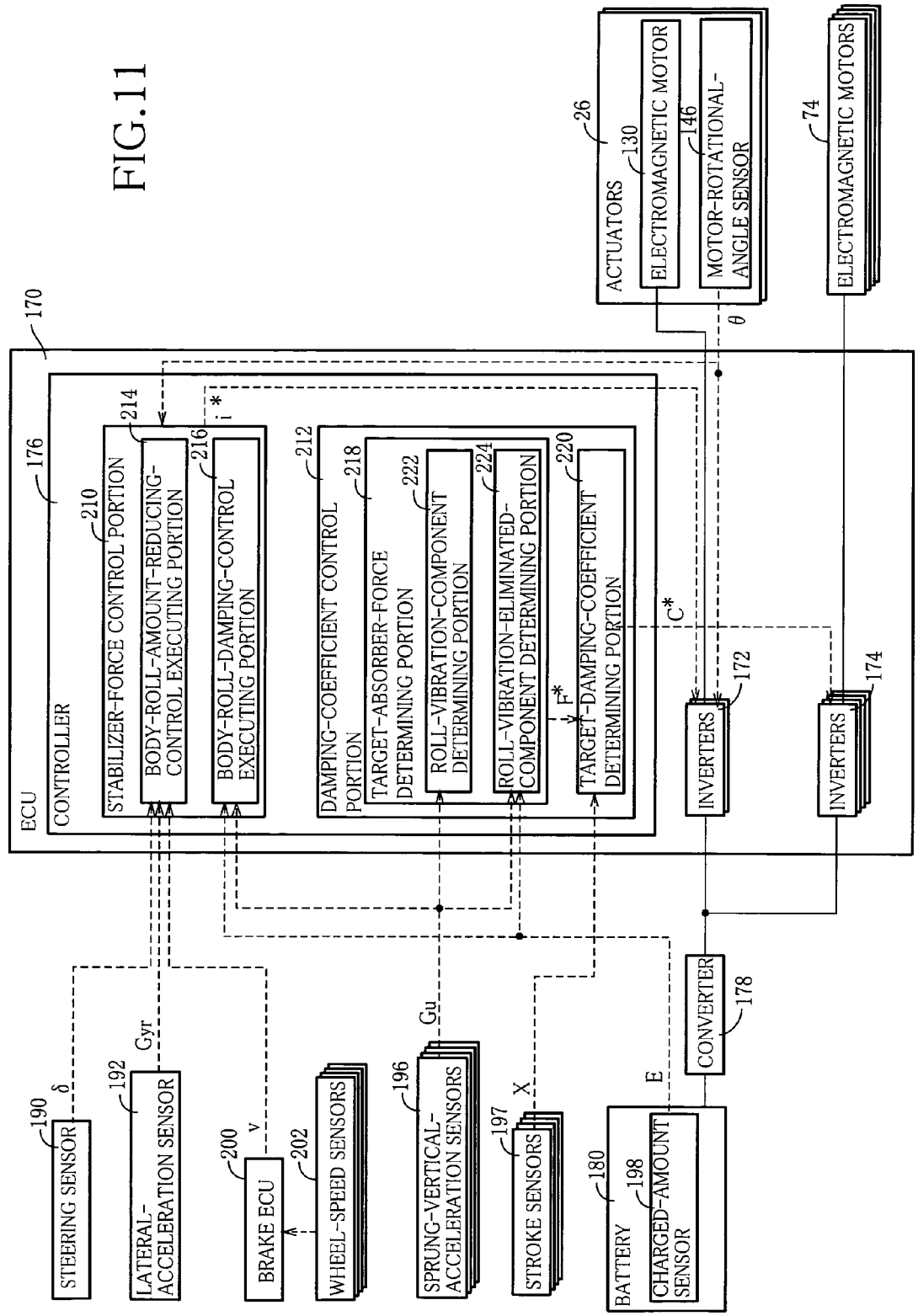
FIG. 11 is a block diagram showing functions of a control device that governs the control of the suspension system.

As shown in FIG. 1, the present system 10 includes a suspension-system electronic control unit (suspension ECU) 170 which executes a control for the pair of stabilizer apparatuses 14 and the four absorbers 52. The suspension ECU 170 is a control device which controls the operation of each of the actuators 26 of the respective stabilizer apparatuses 14 and the operation of each of the electromagnetic motors 74 of the respective absorbers 52. The suspension ECU 170 includes: two inverters 172, each as a drive circuit, which respectively correspond to the electromagnetic motors 130 of the respective actuators 26; four inverters 174, each as a drive circuit, which respectively correspond to the electromagnetic motors 74 of the respective absorbers 52; and a controller 176 constituted mainly by a computer including a CPU, a ROM, a RAM, etc., as shown in FIG. 11. The inverters 172, 174 are connected to a battery 180 via a converter 178. The inverters 172 are connected to the corresponding electromagnetic motors 130 of the respective stabilizer apparatuses 14 while the inverters 174 are connected to the corresponding electromagnetic motors 74 of the respective absorbers 52.

Each of the electromagnetic motors 130 of the respective actuators 26 in the stabilizer apparatuses 14 is configured to be driven at a constant voltage, and the amount of electric power to be supplied to the electromagnetic motor 130 is changed by changing the amount of electric current to be supplied. In this respect, the supply amount of electric current is changed such that the corresponding inverter 172 changes a ratio (duty ratio) of a pulse-on time to a pulse-off time by PWM (Pulse Width Modulation).

To the controller 176, there are connected, in addition to the motor-rotational-angle sensors 146, a steering sensor 190 for detecting an operational angle of the steering wheel that is an operational amount of the steering operating member as a steering amount, a lateral-acceleration sensor 192 for detecting actual lateral acceleration that is lateral acceleration actually generated in the vehicle body, sprung-vertical-acceleration sensors 196 each of which is disposed on the corresponding mount portion 54 for detecting vertical acceleration of the sprung portion (sprung-portion vertical acceleration) for the corresponding wheel, stroke sensors 197 each for detecting a distance between the sprung portion and the unsprung portion for a corresponding one of the four wheels 16, and a charged-amount sensor 198 for detecting a charged amount of the battery 180, i.e., a remaining amount of charged electric energy. There is further connected, to the controller 176, a brake electronic control unit (hereinafter referred to as "brake ECU" where appropriate) 200 as a control device for a brake system. To the brake ECU 200, there are connected four wheel-speed sensors 202 which are provided for the respective four wheels 16 for detecting rotational speeds of the respective wheels 16. The brake ECU 200 has a function of estimating a running speed of the vehicle (hereinafter referred to as "vehicle speed" where appropriate) based on values detected by the respective wheel-speed sensors 202. The controller 176 is configured to obtain the vehicle speed from the brake ECU 200 as needed. The controller 176 is connected to the inverters 172, 174 for controlling the same 172, 174, thereby controlling the electromagnetic motors 130 of the respective stabilizer apparatuses 14 and the electromagnetic motors 74 of the respective absorbers 52. The ROM of the computer of the controller 176 stores programs, various data, and so on relating to the control of the present suspension system 10 as explained below.

2. Control of Suspension System 2.1. Control of Stabilizer Apparatus

In the present suspension system 10, the stabilizer apparatus 14 can controllably generate the stabilizer force by which the distance between the sprung portion and the unsprung portion for the left wheel 16 and the distance between the sprung portion and the unsprung portion for the right wheel 16 are changed relative to each other as described above. By controlling the stabilizer force generated by the stabilizer apparatus 14, there can be executed a control for suppressing roll of the vehicle body caused due to turning of the vehicle, unevenness or irregularities of the road surface on which the vehicle runs, and so on. As the roll suppressing control for suppressing the roll of the vehicle body, the following two controls are executed in the present system 10: a body-roll-amount reducing control for reducing the roll amount of the vehicle body; and a body-roll damping control for damping the movement of the vehicle body in the roll direction. The present system 10 executes a control in which the two controls are integrated. In the integrated control, the motor rotational angle of the electromagnetic motor 130 of each stabilizer apparatus 14 is controlled for permitting the stabilizer apparatus 14 to generate an appropriate stabilizer force based on the roll moment that the vehicle body undergoes, the roll speed of the vehicle body, and so on. In more detail, a target motor rotational angle as a target of the rotational angle of each electromagnetic motor 130 is determined based on the roll moment that the vehicle undergoes, the roll speed of the vehicle body, and so on, and the electromagnetic motor 130 is controlled such that an actual motor rotational angle coincides with the determined target motor rotational angle.

In the present system 10, the above-indicated target motor rotational angle is determined by summing target-motor-rotational-angle components each as a target component in each of the body-roll-amount reducing control and the body-roll damping control, namely, by summing a motor-rotational-angle component in the body-roll-amount reducing control (i.e., a roll-amount reducing component) $\theta^*_T$ and a motor-rotational-angle component in the body-roll damping control (i.e., a roll damping component) $\theta^*_G$. Hereinafter, the body-roll-amount reducing control and the body-roll damping control will be explained in detail focusing on a manner of determining the target-motor-rotational-angle component in each control. There will be further explained in detail a manner of determining, based on the target motor rotational angle, an electric power to be supplied to each electromagnetic motor 130.

(a) Body-Roll-Amount Reducing Control

In the body-roll-amount reducing control, for reducing the roll amount of the vehicle body caused due to turning of the vehicle, the stabilizer force is generated, upon turning of the vehicle, in accordance with the roll moment that the vehicle undergoes due to the turning. More specifically explained, there is determined, according to the following formula, control-use lateral acceleration Gy* which is lateral acceleration to be utilized in the control and which is lateral acceleration indicative of the roll moment that the vehicle body undergoes, based on: estimated lateral acceleration Gyc which is estimated on the basis of the steering angle δ of the steering wheel and the vehicle running speed v; and actual lateral acceleration Gyr that is actually measured:

$$Gy^* = K_1 \cdot Gyc + K_2 \cdot Gyr$$

wherein $K_1$ and $K_2$ are gains. The roll-amount reducing component $\theta^*_T$ is determined based on the thus determined control-use lateral acceleration Gy*. There is stored, in the controller 176, map data of roll-amount reducing component $\theta^*_T$ that utilizes control-use lateral acceleration Gy* as a parameter. The roll-amount reducing component $\theta^*_T$ is determined referring to the map data.

(b) Body-Roll Damping Control

In the body-roll damping control, for damping the movement of the vehicle body in the roll direction, the stabilizer force is controlled to act as a roll damping force having a magnitude in accordance with a roll speed of the vehicle body relative to a horizontal plane. More specifically explained, absolute speeds of the sprung portions (sprung-portion absolute speeds) Vu are initially calculated based on respective sprung vertical accelerations Gu of the respective sprung portions detected by the respective sprung-vertical-acceleration sensors 196 provided on the respective wheels 16. Subsequently, there is calculated a difference between: a right-wheel average sprung-portion absolute speed $Vu_{AVR}$ that is an average value of the sprung-portion absolute speed corresponding to the front right wheel and the sprung-portion absolute speed corresponding to the rear right wheel; and a left-wheel average sprung-portion absolute speed $Vu_{AVL}$ that is an average value of the sprung-portion absolute speed corresponding to the front left wheel and the sprung-portion absolute speed corresponding to the rear left wheel. On the basis of the calculated speed difference and an average tread width L that is an average value of a tread width on the front-wheel side and a tread width on the right-wheel side, a roll speed ω of the vehicle body is determined according to the following formula:

$$\omega = (Vu_{AVR} - Vu_{AVL})/L$$

On the basis of the determined roll speed ω of the vehicle body, required damping moment M that is required for damping the roll of the vehicle body is calculated according to the following formula:

$$M = Cr \cdot \omega$$

In the above formula, Cr is a gain for generating the damping force in accordance with the speed of the movement of the vehicle body in the roll direction and may be considered as a damping coefficient with respect to the roll movement of the vehicle body.

Where the stabilizer apparatus 14 generates the roll damping force in accordance with the thus determined damping moment M, the roll of the vehicle body can be effectively damped. Accordingly, it is preferable that the stabilizer apparatus 14 generate the roll damping force in accordance with the above-described damping moment M. In this respect, however, since the actuator 26 of the stabilizer apparatus 14 is operated based on the force generated by the corresponding electromagnetic motor 130, it is necessary to take account of power consumption by the electromagnetic motor 130. In particular when the charged amount (the remaining amount) in the battery 180 is small, it is desired that the electric power consumed by the electromagnetic motor 130 be made small. In the present system 10, therefore, the degree of the magnitude of the roll damping force by the stabilizer force is made lower in an instance where the charged amount of the battery 180 is small than in an instance where the charged amount of the battery 180 is large, in an attempt to reduce the stabilizer force in the body-roll damping control. In other words, the ratio of the stabilizer force in the body-roll damping control with respect to the roll damping force in accordance with the damping moment M is made low. More specifically, stabilizer-force-dependent damping moment Ms that is damping moment to be generated by the stabilizer apparatus 14 becomes small with a decrease in a charged amount E of the battery 180, utilizing a gain that changes based on the charged amount E as a parameter.

In this respect, however, the damping effect with respect to the roll of the vehicle body may be deteriorated where the degree of the magnitude of the roll damping force by the stabilizer force is simply lowered. In the present system 10, therefore, the damping coefficient of each absorber 52 is controlled to cover or compensate the reduction in the roll damping force by the stabilizer force when the degree of the magnitude of the roll damping force by the stabilizer force is changed, for the purpose of maintaining the damping effect with respect to the roll of the vehicle body, as explained in detail below. In other words, the damping coefficient of the absorber 52 is controlled such that a component of the absorber force for damping the roll of the vehicle body is changed in accordance with the degree of the magnitude of the roll damping force by the stabilizer force.

In the present system 10, the roll of the vehicle body is damped by the cooperation of the stabilizer apparatus 14 and the absorbers 52. Each absorber 52 is configured to generate, with respect to the relative movement of the sprung portion and the unsprung portion, a damping force whose magnitude depends on the speed of the relative movement of the sprung portion and the unsprung portion and whose magnitude is based on its damping coefficient. That is, the damping coefficient needs to be increased in order to increase the absorber force that is to be generated at the same relative speed. In the meantime, the value of the damping coefficient affects the property of transmission of a vibration from the unsprung portion to the sprung portion. More specifically described, the transmission property of a vibration in the unsprung resonance frequency range becomes high with an increase in the damping coefficient. Accordingly, where the damping coefficient of the absorber 52 is increased during running of the vehicle on a road surface on which the vibration in the unsprung resonance frequency range tends to generate, the transmission property of the vibration in the unsprung resonance frequency range becomes high, causing a risk of deterioration in the ride comfort as felt by vehicle passengers. In the present system 10, therefore, the absorber force for damping the roll of the vehicle body is made smaller in an instance where the intensity of the vibration of the unsprung resonance frequency is high than in an instance where the intensity of the vibration of the unsprung resonance frequency is low, for making the value of the damping coefficient small. On the other hand, for maintaining the damping effect with respect to the roll of the vehicle body, the degree of the magnitude of the roll damping force by the stabilizer force is made higher in an instance where the intensity of the vibration of the unsprung resonance frequency is high than in an instance where the intensity of the vibration of the unsprung resonance frequency is low. That is, in the body-roll damping control, the stabilizer-force-dependent damping moment $M_S$ is made large with an increase in an amplitude α of the vibration of the unsprung resonance frequency, by changing a control gain based on the amplitude α as the intensity of the vibration while utilizing the amplitude α as a parameter.

Because the stabilizer force is defined as a force by which the distance between the sprung portion and the unsprung portion for the left wheel and the distance between the sprung portion and the unsprung portion for the right wheel are changed relative to each other, the stabilizer force can be applied as a damping force with respect to the vibration of the vehicle body in the roll direction, but cannot be applied as a damping force with respect to vibrations in a heave direction, a pitch direction and the like, of the vehicle body. On the other hand, since the absorber forces of the respective absorbers 52 can be controlled independently from each other, each absorber 52 is controlled to damp not only the roll vibration of the vehicle body but also the heave vibration, the pitch vibration and the like, of the vehicle body. However, there is a limit in the absorber force that can be generated by each absorber 52. In the light of this, in an instance where the vibrations other than the roll vibration are large, e.g., in an instance where the heave vibration is large, the vibrations other than the roll vibration are preferably dealt with by the absorber 52 while the roll vibration is preferably dealt with by the stabilizer apparatus 14. Accordingly, in the present system 10, the degree of the magnitude of the roll damping force by the stabilizer force is made higher in an instance where the intensity of the heave vibration of the vehicle body is high than in an instance where the intensity of the heave vibration of the vehicle body is low, for the purpose of enhancing the damping effect to be exhibited by the stabilizer force with respect to the roll of the vehicle body. More specifically explained, the stabilizer-force-dependent damping moment Ms is made large with an increase in an amplitude β of the heave vibration by changing a control gain based on the amplitude β as the intensity of the heave vibration while utilizing the amplitude β as a parameter.

While the intensity of the heave vibration is employed as the parameter in the present system 10, the intensity of the pith vibration may be employed as the parameter. Further, the degree of the magnitude of the roll damping force by the stabilizer force may be changed by measuring directly an intensity of the vibration of the vehicle body such as the heave vibration, the pitch vibration, or the like, as described above. Moreover, the degree of the magnitude of the roll damping force may be changed based on other parameters by which the intensity of the vibration of the vehicle body can be estimated, such as the running speed of the vehicle. More specifically explained, the running speed of the vehicle closely relates to a power spectral density indicative of a degree of unevenness or irregularities of the road surface. The power spectral density tends to increase with an increase in the running speed of the vehicle. Accordingly, the vibration in a relatively low frequency range due to the road surface irregularities is likely to be generated in the vehicle body with an increase in the running speed of the vehicle, and the intensities of the heave vibration and the pitch vibration tend to become high. Accordingly, even when the degree of the magnitude of the roll damping force by the stabilizer force is changed on the basis of the running speed of the vehicle, it is possible to obtain the same effect as in the case in which the degree of the magnitude of the roll damping force by the stabilizer force is changed by directly measuring the intensity of the vibration of the vehicle body.

The stabilizer-force-dependent damping moment $M_S$ is determined according to the following formula, utilizing various control gains each of which changes based on a corresponding one of the charged amount E of the battery 180, the amplitude α of the vibration of the unsprung resonance frequency, and the amplitude β of the heave vibration of the vehicle body:

$$M_S = K_E \cdot K\alpha \cdot K\beta \cdot M$$

In the above formula, $K_E$ is a control gain that depends on the charged amount E of the battery 180, Kα is a control gain that depends on the amplitude α of the vibration of the unsprung resonance frequency, and Kβ is a control gain that depends on the amplitude β of the heave vibration of the vehicle body.

The control gain $K_E$ is set by taking account of the charged amount E of the battery 180. That is, the control gain $K_E$ is set so as to become small with a decrease in the charged amount E of the battery 180, as shown in FIG. 7(a), for decreasing the stabilizer-force-dependent damping moment $M_S$ with the decrease in the charged amount E. The control gain Kα is set by taking account of the property of transmission of the vibration in the relatively high frequency range to the sprung portion. That is, the control gain Kα is set so as to become large with an increase in the amplitude α of the vibration of the unsprung resonance frequency, as shown in FIG. 7(b), for increasing the stabilizer-force-dependent damping moment $M_S$ with the increase in the amplitude α. The control gain Kβ is set so as to become large with an increase in the amplitude β of the heave vibration of the vehicle body, as shown in FIG. 7(c), for increasing the stabilizer-force-dependent damping moment $M_S$ with the increase in the amplitude β. As apparent from FIGS. 7(a)-7(c), each of the gains $K_E$, Kα, Kβ is arranged to change between 0 and 1.

The amplitude α of the vibration of the unsprung resonance frequency is determined by carrying out filtering of the vibrations of the sprung portion so as to calculate the vibration component in the unsprung resonance frequency range. More specifically explained, the sprung vertical acceleration Gu is initially detected by each sprung-vertical-acceleration-sensor 196, and the filtering is carried out for the vibration in a range of ±3 Hz from the unsprung resonance frequency, on the basis of the detected vertical acceleration Gu. Subsequently, there is calculated a maximum amplitude as the intensity of the vibration in the unsprung resonance frequency range. In the present system 10, an average value of the maximum amplitudes calculated for the respective wheels 16 is made as the amplitude α of the vibration of the unsprung resonance frequency. The amplitude β of the heave vibration of the vehicle body is calculated by carrying out abstraction of the heave vibration from the vibration of the vehicle body. More specifically explained, the acceleration of the vehicle body in the heave direction is calculated by summing the sprung vertical accelerations Gu for the respective wheels 16, and the calculation of the amplitude β is carried out based on the calculated acceleration. In the present system 10, the calculated maximum amplitude is made as the amplitude β of the heave vibration of the vehicle body.

On the basis of the thus determined stabilizer-force-dependent damping moment $M_S$, the roll damping component $\theta^*_G$ is determined. There is stored, in the controller 176, map data of roll damping component $\theta^*_G$ that utilizes, as a parameter, stabilizer-force-dependent damping moment $M_S$. The roll damping component $\theta^*_G$ is determined referring to the map data.

(c) Control of Operation of Stabilizer Apparatus

After the roll-amount reducing component $\theta^*_T$ and the roll damping component $\theta^*_G$ have been determined as described above, the target motor rotational angle $\theta^*$ is determined according to the following formula:

$$\theta^* = \theta^*_T + \theta^*_G$$

The electromagnetic motor 130 is controlled such that the actual motor rotational angle $\theta$ coincides with the thus determined target motor rotational angle $\theta^*$. In the control of the electromagnetic motor 130, the electric power to be supplied to the same 130 is determined based on motor-rotational-angle deviation $\Delta\theta (=\theta^*-\theta)$ which is deviation of the actual motor rotational angle $\theta$ with respect to the target motor rotational angle $\theta^*$. More specifically explained, the electric power to be supplied to the electromagnetic motor 130 is determined according to a feedback control technique based on the motor-rotational-angle deviation $\Delta\theta$. Initially, the motor-rotational-angle deviation $\Delta\theta$ is identified based on the value detected by the motor-rotational-angle sensor 146 of the electromagnetic motor 130. Subsequently, the target supply current $i^*$ is determined utilizing the motor-rotational-angle deviation $\Delta\theta$ as a parameter, according to the following formula:

$$i^* = K_P \cdot \Delta\theta + K_I \cdot Int(\Delta\theta)$$

The above-indicated formula is according to a PI control rule. The first term and the second term in the formula respectively mean a proportional-term component and an integral-term component, and $K_P$, $K_I$ in the formula are a proportional gain and an integral gain, respectively. Further, $Int(\Delta\theta)$ in the formula corresponds to an integral value of the motor-rotational-angle deviation $\Delta\theta$.

The target supply current $i^*$ indicates the direction of generation of the motor force of the electromagnetic motor 130 depending upon its sign (+, −). When the electromagnetic motor 130 is controlled by being driven, the duty ratio and the direction of generation of the motor force for driving the motor 130 are determined on the basis of the target supply current $i^*$. Commands indicative of the determined duty ratio and direction of generation of the motor force are sent to the corresponding inverter 172, whereby the electromagnetic motor 130 is controlled by the inverter 172 based on the commands.

In the present embodiment, the target supply current $i^*$ is determined according to the PI control rule. The target supply current $i^*$ may be determined according to a PDI control rule. In this instance, the target supply current $i^*$ may be determined according to the following formula, for instance:

$$i^* = K_P \cdot \Delta\theta + K_I \cdot Int(\Delta\theta) + K_D \cdot \Delta\theta'$$

wherein $K_D$ is a differential gain, and the third term means a differential-term component.

2.2. Control of Damping Coefficient of Absorber

Each absorber 52 is configured to generate, with respect to the relative movement of the sprung portion and the unsprung portion, a damping force whose magnitude corresponds to the speed of the relative movement of the sprung portion and the unsprung portion. Since the damping coefficient on which the damping force is based is changeable, the absorber force can be generated controllably to a certain extent. In the present system 10, therefore, the vibration of the vehicle body in the roll direction is dealt with by cooperation of the absorbers 52 and the stabilizer apparatus 14 while the vibrations of the vehicle body other than the vibration in the roll direction are dealt with by the absorbers 52.

In more detail, the absorber force to be generated by each absorber 52, namely, a target absorber force $F^*$, is determined by summing a target absorber-force component (anti-roll-vibration component) $F^*_K$ for damping the vibration of the vehicle body in the roll direction and a target absorber-force component (anti-roll-eliminated-vibration component) $F^*_E$ for damping the vibrations of the vehicle body other than the vibration in the roll direction. The damping coefficient of each absorber 52 is determined such that the absorber force to be actually generated coincides with the determined target absorber force $F^*$. There will be hereinafter explained in detail a manner of determining the anti-roll-vibration component $F^*_K$, and a manner of determining the anti-roll-eliminated-vibration component $F^*_E$, and a manner of determining a target damping coefficient $C^*$ that is a damping coefficient of each absorber 52 to be realized by the control.

(a) Anti-Roll-Vibration Component

For effectively damping the roll of the vehicle body by cooperation of the stabilizer apparatus 14 and the absorbers 52, the anti-roll-vibration component $F^*_K$ is determined based on absorber-force-dependent damping moment $M_A$ that is a difference between the damping moment M having a magnitude in accordance with the roll speed of the vehicle and the stabilizer-force-dependent damping moment $M_S$. More specifically, the absorber-force-dependent damping moment $M_A$ is calculated according to the following formula:

$$M_A = M - M_S = M - K_E \cdot K\alpha \cdot K\beta \cdot M = (1 - K_E \cdot K\alpha \cdot K\beta) \cdot M$$

Subsequently, the anti-roll-vibration component $F^*_K$ is determined so as to generate the absorber force in accordance with the calculated absorber-force-dependent damping moment $M_A$. The absorber-force-dependent damping moment $M_A$ is generated by absorber forces whose directions are opposite to each other and which are generated by the absorbers 52 provided for the left and right wheels 16, respectively. Accordingly, the anti-roll-vibration component $F^*_{KR}$ for the absorber 52 on the right-wheel side and the anti-roll-vibration component $F^*_{KL}$ for the absorber 52 on the left-wheel side are determined according to the following formulas:

$$F^*_{KR} = K_3 \cdot M_A$$

$$F^*_{KL} = -K_3 \cdot M_A$$

wherein $K_3$ is a control gain for converting the absorber-force-dependent damping moment $M_A$ into a roll damping force by each absorber 52 having a magnitude in accordance with the moment $M_A$.

(b) Anti-Roll-Eliminated-Vibration Component

For dealing with the vibrations of the vehicle body other than the vibration in the roll direction, the anti-roll-eliminated-vibration component $F^*_E$ is determined by eliminating a speed component in the roll direction from a speed of the movement of the vehicle body in the vertical direction, namely, a so-called sprung-portion absolute speed. The magnitude of the speed component in the roll direction is half an absolute value of a difference between the right-wheel average sprung-portion absolute speed $Vu_{AVR}$ and the left-wheel average sprung-portion absolute speed $Vu_{AVL}$. The sign (+ −) of the speed component in the roll direction for the right-wheel side and the sign (+ −) of the speed component in the roll direction for the left-wheel side are opposite to each other. Accordingly, the anti-roll-eliminated-vibration component $F^*_{ER}$ corresponding to the absorber 52 disposed on the right-wheel side and the anti-roll-eliminated-vibration component $F^*_{EL}$ corresponding to the absorber 52 disposed on the left-wheel side are determined according to the following formulas:

$$F^*_{ER} = C_E \cdot (Vu_R - |Vu_{AVR} - Vu_{AVL}|/2)$$

$$F^*_{EL} = C_E \cdot \{Vu_L - (-|Vu_{AVR} - Vu_{AVL}|/2)\}$$
$$= C_E \cdot (Vu_L + |Vu_{AVR} - Vu_{AVL}|/2)$$

In the above formulas, $C_E$ is a control gain for generating a damping force in accordance with the vibration speed of the vehicle body and may be considered as a damping coefficient with respect to the sprung vibration. Further, $Vu_R$ is a sprung-portion absolute speed Vu corresponding to the right-wheel side while $Vu_L$ is a sprung-portion absolute speed Vu corresponding to the left-wheel side.

(c) Determination of Target Damping Coefficient

After the anti-roll-vibration component $F^*_K$ and the anti-roll-eliminated-vibration component $F^*_E$ have been determined as described above, the target absorber force F* is determined according to the following formula:

$$F^*=F^*_K+F^*_E$$

The absorber 52 is configured to generate the absorber force having a magnitude that depends on a relative speed $V_S$ of the sprung portion and the unsprung portion, and the damping coefficient of the absorber 52 is the basis for the absorber force. Accordingly, the target damping coefficient C* is determined according to the following formula:

$$C^*=F^*/V_S$$

The operation of the electromagnetic motor 74 of each absorber 52 is controlled such that the damping coefficient of the absorber 52 becomes equal to the determined target damping coefficient C*. In this regard, where the determined damping coefficient C* is smaller than the minimum damping coefficient $C_{min}$, the target damping coefficient C* is changed into the minimum damping coefficient $C_{min}$. Further, where the determined damping coefficient C* is larger than the maximum damping coefficient $C_{max}$, the target damping coefficient C* is changed into the maximum damping coefficient $C_{max}$.

Though each absorber 52 can generate a resistance force against the movement of the sprung portion and the unsprung portion toward or away from each other, it cannot generate a force for positively moving the sprung portion and the unsprung portion toward or away from each other, i.e., a propulsive force. Accordingly, when the sprung portion and the unsprung portion move toward or away from each other in a direction in which the absorber force should be generated, the absorber 52 cannot generate the absorber force in the desired direction. Further, in such an instance, the absorber 52 generates the absorber force in a direction opposite to the desired direction, thereby causing a risk that the absorber force hinders the vibration damping. In the present system 10, therefore, when the sprung portion and the unsprung portion move toward or away from each other in the direction in which the absorber force should be generated, the target damping coefficient C* is made equal to the minimum damping coefficient $C_{min}$ for making the absorber force as small as possible.

More specifically explained, in the present system 10, the relative speed $V_S$ of the sprung portion and the unsprung portion is made plus (+) where the sprung portion and the unsprung portion move away from each other while the relative speed $V_S$ of the sprung portion and the unsprung portion is made minus (−) where the sprung portion and the unsprung portion move toward each other. Further, the absorber force is made plus (+) where the direction in which the absorber force is generated is a bound direction while the absorber force is made minus (−) where the direction in which the absorber force is generated is a rebound direction. Accordingly, the target damping coefficient C* is made equal to the minimum damping coefficient $C_{min}$ where the sign of the relative speed $V_S$ of the sprung portion and the unsprung portion and the sign of the target absorber force F* are mutually different, namely, where the direction in which the absorber force should be generated is the bound direction and the sprung portion and the unsprung portion move toward each other and where the direction in which the absorber force should be generated is the rebound direction and the sprung portion and the unsprung portion move away from each other.

In the present system 10, the target absorber force F* is determined by adding the anti-roll-vibration component $F^*_K$ and the anti-roll-eliminated-vibration component $F^*_E$. The following explanation is made taking the right-wheel side of the vehicle, as an example. A right-wheel target absorber force $F^*_R$ that is the target absorber force F* on the right-wheel side is determined according to the following formula:

$$F^*_R=F^*_{KR}+F^*_{ER}$$

The above formula can be changed into the following:

$$F^*_R = K_3 \cdot M_A + C_E \cdot (Vu_R - |Vu_{AVR} - Vu_{AVL}|/2)$$
$$= K_3 \cdot (M - M_S) + C_E \cdot (Vu_R - |Vu_{AVR} - Vu_{AVL}|/2)$$
$$= K_3 \cdot M - K_3 \cdot M_S + C_E \cdot Vu_R - C_E \cdot |Vu_{AVR} - Vu_{AVL}|/2$$

In the above formulas, $K_3 \cdot M$ is a roll damping force having a magnitude in accordance with the damping moment M and obtained by conversion of the moment M, and may be considered as a roll damping force having a magnitude in accordance with the roll speed of the vehicle body. Further, because $|Vu_{AVR}-Vu_{AVL}|/2$ indicates the magnitude of the speed component of the vehicle body in the roll direction, $C_E \cdot |Vu_{AVR}-Vu_{AVL}|/2$ may be considered as a roll damping force in accordance with the speed of the vibration of the vehicle body in the roll direction. That is, $K_3 \cdot M$ and $C_E \cdot |Vu_{AVR}-Vu_{AVL}|/2$ may be considered to be identical with each other. Therefore, the target absorber force F* is indicated by the following formula:

$$F^*_R=C_E \cdot Vu_R-K_3 \cdot M_S$$

In the above formula, $C_E \cdot Vu_R$ indicates a damping force having a magnitude in accordance with the sprung-portion absolute speed and may be considered as a damping force required to damp the movement of the sprung portion. In other words, $C_E \cdot Vu_R$ may be considered as a required sprung damping force. Further, $K_3 \cdot M_S$ is a damping force having a magnitude in accordance with the stabilizer-force-dependent moment $M_S$ and obtained by conversion of the moment $M_S$, and may be considered as a damping force with respect to the movement of the sprung portion that is obtained by the stabilizer force in the body-roll damping control. In other words, $K_3 \cdot M_S$ may be considered as a stabilizer-force-dependent sprung damping force. Accordingly, in the present system 10, the target absorber force F* can be determined by subtracting the stabilizer-force-dependent sprung damping force from the required sprung damping force.

3. Control Programs

Figure 8:
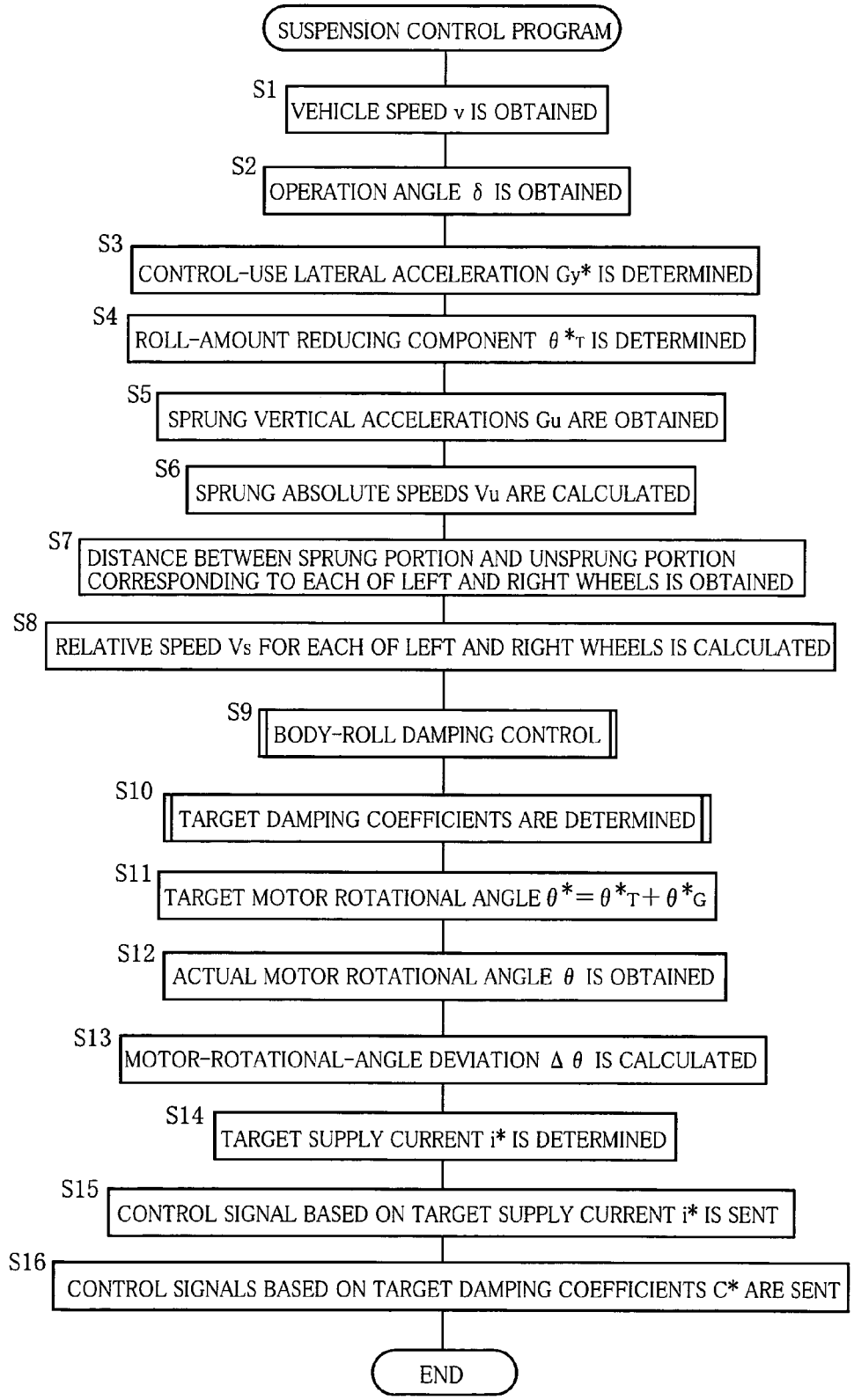
FIG. 8 is a flow chart showing a suspension control program.

The control of the present suspension system 10, namely, the control of the stabilizer force to be generated by each stabilizer apparatus 14 and the control of the damping coefficient of each absorber 52 are executed such that a suspension control program indicated by a flow chart of FIG. 8 is implemented by the controller 176. The program is repeatedly implemented at short intervals (e.g., several milliseconds) with an ignition switch placed in an ON state. The flow of the control will be briefly explained referring to the flow chart. The suspension control program is implemented for the pair of absorbers 52 and the stabilizer apparatus 14 that are provided on the front-wheel side and the pair of absorbers 52 and the stabilizer apparatus 14 that are provided on the rear-wheel side. In the following description, there will be explained processing by the program executed on the pair of absorbers 52 and the stabilizer apparatus for one of the front-wheel side and the rear-wheel side, for the interest of brevity.

In the processing according to the program, step S1 ("step" is omitted where appropriate) is initially implemented to obtain the vehicle speed v based on the value calculated by the brake ECU 200. Next, in S2, the operation angle δ of the steering wheel is obtained based on the value detected by the steering sensor 190. S2 is followed by S3 in which the control-use lateral acceleration Gy* is determined. S3 is followed by S4 to determine the roll-amount reducing component $\theta^*_T$ based on the determined control-use lateral acceleration Gy*.

Subsequently, in S5, the sprung vertical accelerations Gu are detected by the respective sprung-vertical-acceleration sensors 196 provided on the respective wheels 16. S5 is followed by S6 in which there are calculated sprung-portion absolute speeds Vu based on the respective sprung vertical accelerations Gu. Then, S7 is implemented to detect a distance between the sprung portion and the unsprung portion for each of the left and right wheels 16 corresponding to the absorbers 52 for which the program is executed. Next, in S8, based on the detected distances, the relative speed $V_S$ of the sprung portion and the unsprung portion for each of the left and right wheels 16 is calculated.

Figure 9:
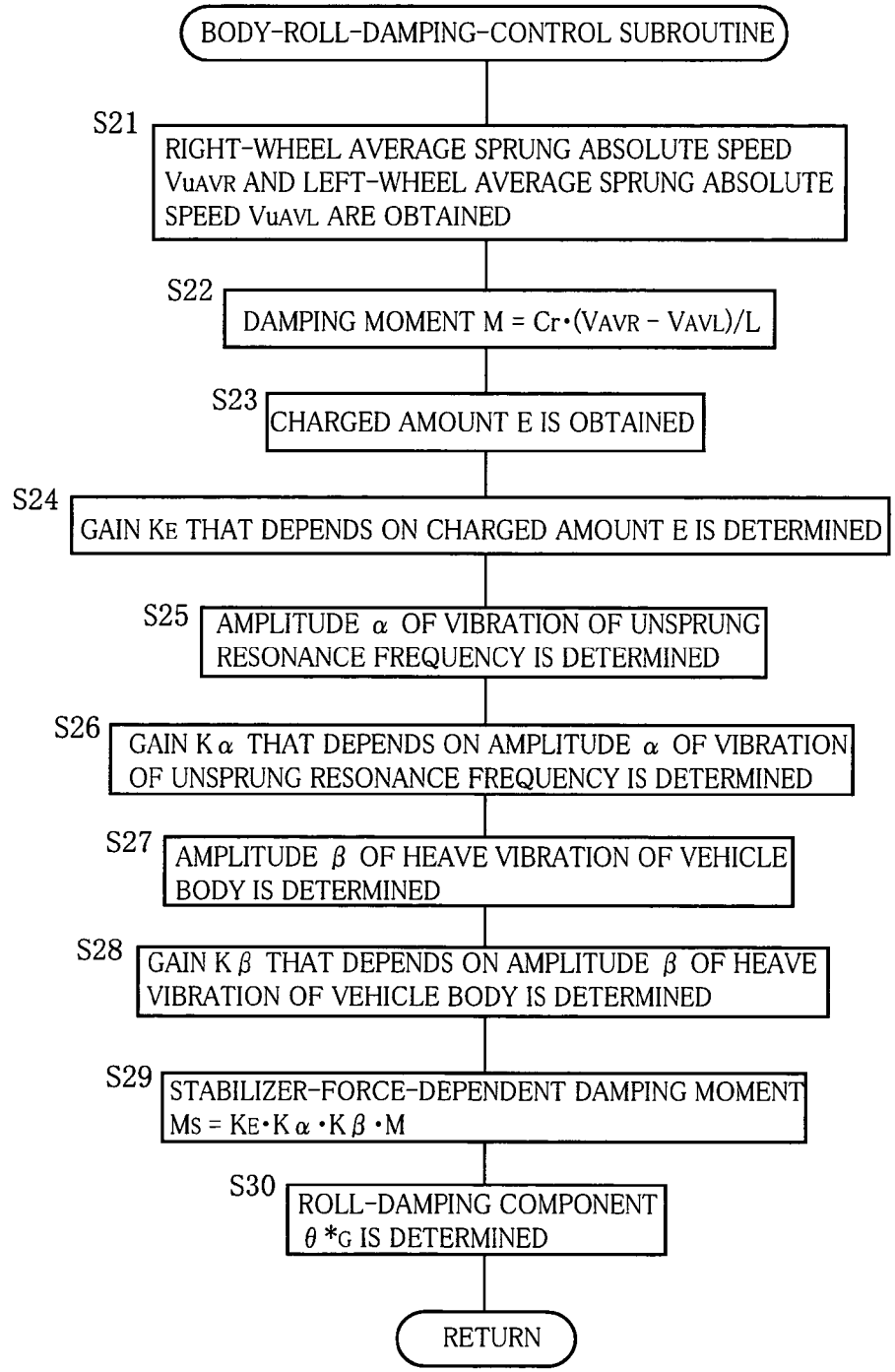
FIG. 9 is a flow chart showing a body-roll-damping control subroutine executed in the suspension control program.

Subsequently, in S9, there is executed processing for executing a body-roll-damping-control subroutine indicated by a flow chart of FIG. 9. In the subroutine, S21 is initially implemented to calculate the right-wheel average sprung-portion absolute speed $Vu_{AVR}$ and the left-wheel average sprung-portion absolute speed $Vu_{AVL}$, on the basis of the sprung-portion absolute speeds Vu calculated for the respective wheels 16. Next, in S22, the required damping moment M is calculated based on a difference between the right-wheel average sprung-portion absolute speed $Vu_{AVR}$ and the left-wheel average sprung-portion absolute speed $Vu_{AVL}$.

Subsequently, in S23, the charged amount E of the battery 180 is detected by the charged-amount sensor 198. S23 is followed by S24 in which the gain $K_E$ that depends on the charged amount E is determined referring to the map data indicated in FIG. 7(a). Next, in S25, the amplitude α of the vibration of the unsprung resonance frequency is calculated based on the sprung vertical accelerations Gu by carrying out the filtering for the unsprung resonance frequency range. S25 is followed by S26 in which the gain Kα that depends on the amplitude α of the vibration of the unsprung resonance frequency is determined referring to the map data indicated in FIG. 7(b). Next, in S27, the amplitude β of the heave vibration of the vehicle body is calculated based on the acceleration of the vehicle body in the heave direction. S27 is followed by S28 in which the gain Kβ that depends on the amplitude β of the heave vibration of the vehicle body is determined referring to the map data indicated in FIG. 7(c). Then S29 is implemented to determine the stabilizer-force-dependent damping moment $M_S$ on the basis of the determined gains $K_E$, Kα, Kβ and damping moment M. Subsequently, S30 is implemented to determine the roll damping component $\theta^*_G$ based on the determined stabilizer-force-dependent damping moment $M_S$. Thus, the subroutine is ended.

Figure 10:
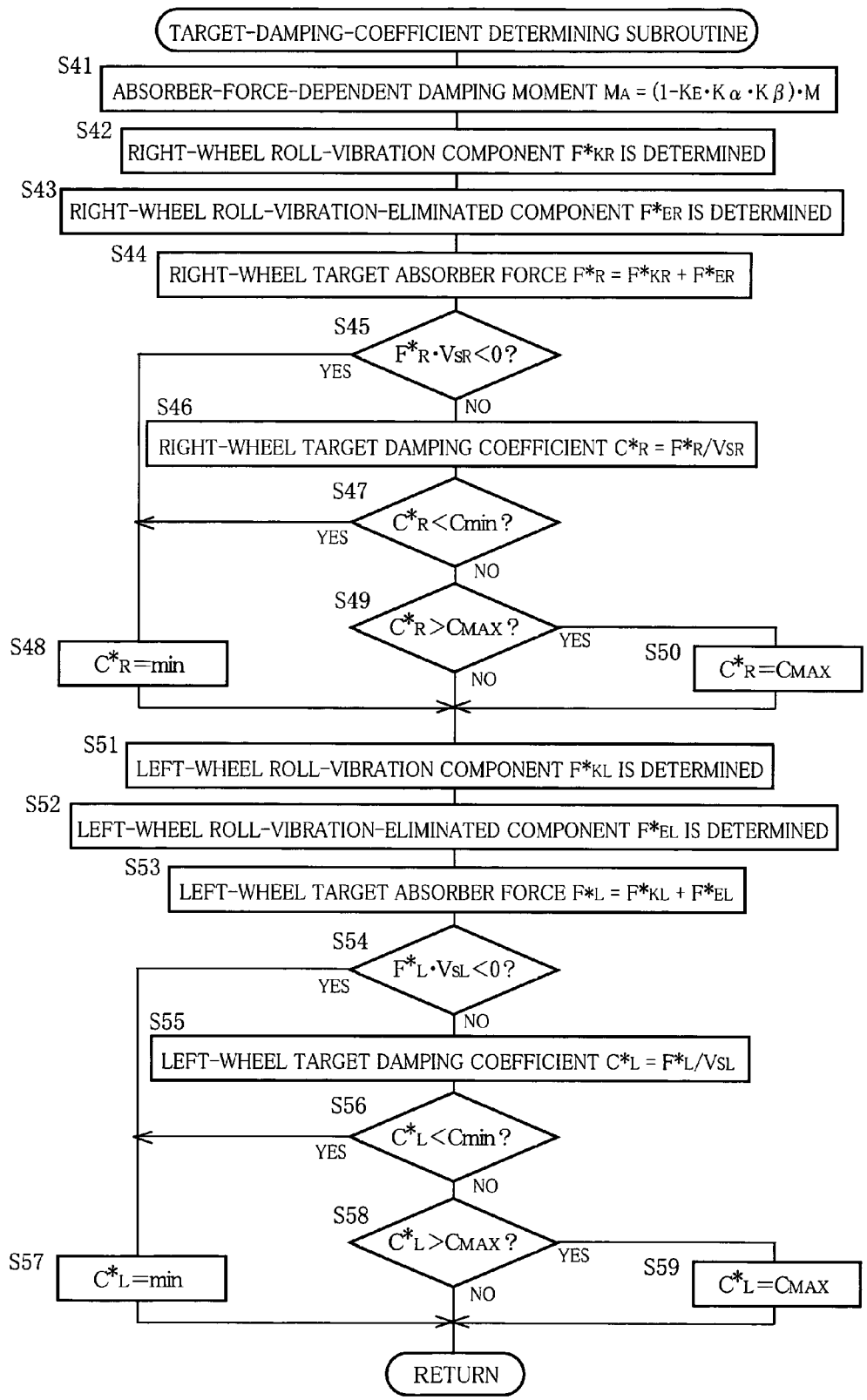
FIG. 10 is a flow chart showing a target-damping-coefficient determining subroutine executed in the suspension control program.

After the body-roll-damping-control subroutine has been executed, there is executed, in S10, processing for executing a target-damping-coefficient determining subroutine indicated by a flow chart of FIG. 10. In the subroutine, S41 is initially implemented to determine the absorber-force-dependent damping moment $M_A$ on the basis of the gains $K_E$, Kβ, Kβ and the damping moment M. Next, S42 is implemented to determine the anti-roll-vibration component $F^*_{KR}$ corresponding to the absorber 52 on the right-wheel side based on the determined absorber-force-dependent damping moment $M_A$, and S43 is implemented to determine the anti-roll-eliminated-vibration component $F^*_{ER}$ corresponding to the absorber 52 on the right-wheel side according to the formula indicated above. Subsequently, S44 is implemented to determine a right-wheel target absorber force $F^*_R$ by summing the anti-roll-vibration component $F^*_{KR}$, and the anti-roll-eliminated-vibration component $F^*_{ER}$ that correspond to the absorber 52 on the right-wheel side.

After the right-wheel target absorber force $F^*_R$ has been determined, S45 is implemented to judge whether the sprung portion and the unsprung portion on the right-wheel side are moving toward or away from each other in the direction of the determined absorber force $F^*_R$. More specifically explained, it is judged in S45 whether the sign of the right-wheel target absorber force $F^*_R$ and the sign of the relative speed $V_{SR}$ of the sprung portion and the unsprung portion on the right-wheel side are different from each other. Where it is judged that the signs are the same, S46 is implemented to determine a right-wheel target damping coefficient $C^*_R$ that is the target damping coefficient C* of the absorber 52 disposed on the right-wheel side, on the basis of the right-wheel target absorber force $F^*_R$ and the relative speed $V_{SR}$. However, where it is judged in S47 that the determined right-wheel target damping coefficient $C^*_R$ is smaller than the minimum damping coefficient $C_{min}$ or it is judged in S45 that the sign of the right-wheel target absorber force $F^*_R$ and the sign of the relative speed $V_{SR}$ are different from each other, S48 is implemented to set the right-wheel target damping coefficient $C^*_R$ at the minimum damping coefficient $C_{min}$. On the other hand, where it is judged in S49 that the determined right-wheel target damping coefficient $C^*_R$ is larger than the maximum damping coefficient $C_{MAX}$, S50 is implemented to set the right-wheel target damping coefficient $C^*_R$ at the maximum damping coefficient $C_{MAX}$. Subsequently, in S51-S53, there is determined a left-wheel target absorber force $F^*_L$ that is the target absorber force F* of the absorber 52 disposed on the left-wheel side, in a manner similar to that for determining the right-wheel target absorber force $F^*_R$. Next, in S54-S59, there is determined a left-wheel target damping coefficient $C^*_L$ that is the target damping coefficient C* of the absorber 52 disposed on the left-wheel side, in a manner similar to that for determining the right-wheel target damping coefficient $C^*_R$. Thus, the subroutine is ended.

After the target-damping-coefficient determining subroutine has been executed, the target motor rotational angle θ* is determined in S11 by summing the roll-amount reducing component $\theta^*_T$ and the roll damping component $\theta^*_G$. Next, in S12, the actual motor rotational angle θ is obtained by the motor-rotational-angle sensor 146. S12 is followed by S13 in which is determined the motor-rotational-angle deviation Δθ that is deviation of the actual motor rotational angle θ with respect to the target motor rotational angle θ*. Thereafter, S14 is implemented to determine the target supply current i* based on the target motor rotational angle θ* according to the above-indicated PI control rule, and subsequently S15 is implemented to send, to the inverter 172, a control signal based on the determined target supply current i*. S15 is followed by S16 in which a control signal based on the above-indicated right-wheel target damping coefficient C*$_R$ is sent to the inverter 174 that corresponds to the absorber 52 on the right-wheel side while a control signal based on the above-indicated left-wheel target damping coefficient C*$_L$ is sent to the inverter 174 that corresponds to the absorber 52 on the left-wheel side. Thus, one execution of the program is ended.

4. Functional Structure of Controller

The controller 176 that executes the above-described suspension control program may be considered to have the functional structure shown in FIG. 11, in view of the processing executed by the controller 176. As apparent from FIG. 11, the controller 176 includes: a stabilizer-force control portion 210 as a functional portion to execute the processing in S1-S6, S11-S15, etc., namely, as a functional portion to control the stabilizer force generated by each stabilizer apparatus 14; and a damping-coefficient control portion 212 as a functional portion to execute the processing in S7-S10, S16, etc., namely, as a functional portion to control the damping coefficient of each absorber 52.

The stabilizer-force control portion 210 includes: a body-roll-amount-reducing-control executing portion 214 as a functional portion to execute the processing in S1-S4, namely, as a functional portion to execute the body-roll-amount reducing control; and a body-roll-damping-control executing portion 216 as a functional portion to execute the processing in S9, namely, as a functional portion to execute the body-roll-damping control. The damping-coefficient control portion 212 includes: a target-absorber-force determining portion 218 as a functional portion to execute the processing in S41-S44 and S51-S53, namely, as a functional portion to determine the target absorber force F* as the absorber force that should be generated by each absorber; and a target-damping-coefficient determining portion 220 as a functional portion to execute the processing in S45-S50 and S54-S59, namely, as a functional portion to determine the target damping coefficient C*. The target-absorber-force determining portion 218 includes: an anti-roll-vibration-component determining portion 222 as a functional portion to execute the processing in S42 and S51, namely, as a functional portion to determine the anti-roll-vibration component F*$_K$ for damping the roll of the vehicle body; and an anti-roll-eliminated-vibration-component determining portion 222 as a functional portion to execute the processing in S43 and S52, namely, as a functional portion to determine the anti-roll-eliminated-vibration component F*$_E$ for damping the vibrations of the vehicle body other than the vibration in the roll direction.

The invention claimed is:

1. A suspension system for a vehicle, comprising:
a stabilizer apparatus which includes: (a) a stabilizer bar whose opposite ends are connected respectively to an unsprung portion on a left-wheel side of the vehicle and an unsprung portion on a right-wheel side of the vehicle and which generates, on the basis of a twist-reacting force thereof, a stabilizer force by which a distance between a sprung portion and the unsprung portion on the left-wheel side and a distance between a sprung portion and the unsprung portion on the right-wheel side are changed relative to each other; and (b) an actuator configured to change the stabilizer force by an operation thereof;
a pair of shock absorbers of a hydraulic type each of which is provided between the sprung portion and the unsprung portion on a corresponding one of the left-wheel side and the right-wheel side and each of which generates an absorber force as a damping force with respect to a relative movement of the sprung portion and the unsprung portion on the corresponding one of the left-wheel side and the right-wheel side toward or away from each other, the pair of shock absorbers respectively including damping-coefficient changing mechanisms each configured to change a damping coefficient that is an ability to generate the absorber force and that is a basis of a magnitude of the absorber force to be generated; and
a control device which is configured to control the stabilizer force of the stabilizer apparatus by controlling the operation of the actuator of the stabilizer apparatus and which is configured to control the damping-coefficient changing mechanisms of the pair of shock absorbers,
wherein the control device is configured to execute a body-roll damping control in which at least a part of the stabilizer force is controlled to act as a roll damping force having a magnitude in accordance with a roll speed of a body of the vehicle,
wherein the control device is configured to change, in the body-roll damping control, a degree of the magnitude of the roll damping force by the stabilizer force and is configured to control, under execution of the body-roll damping control, the damping coefficient of each of the pair of shock absorbers such that a component of the absorber force which is generated by said each of the pair of shock absorbers and which is for damping roll of the body of the vehicle becomes smaller in an instance where the degree of the magnitude of the roll damping force by the stabilizer force is high than in an instance where the degree of the magnitude of the roll damping force by the stabilizer force is low, and
wherein the control device is configured such that, in the body-roll damping control, the degree of the magnitude of the roll damping force by the stabilizer force becomes higher in an instance where an intensity of a vibration of an unsprung resonance frequency is high than in an instance where the intensity of the vibration of the unsprung resonance frequency is low.

2. The suspension system according to claim 1, wherein the control device is configured to control, in the body-roll damping control, the at least a part of the stabilizer force to act as a roll damping force having a magnitude in accordance with a roll speed of the vehicle body relative to a horizontal plane.

3. The suspension system according to claim 2,
wherein a damping force which is required to damp a movement of each of the sprung portions and which has a magnitude in accordance with a sprung-portion absolute speed that is a speed of the movement of said each of the sprung portions is defined as a required sprung damping force while a damping force with respect to the movement of said each of the sprung portions that depends on the roll damping force by the stabilizer force is defined as a stabilizer-force-dependent sprung damping force, and
wherein the control device is configured to control, under execution of the body-roll damping control, the damping coefficient of said each of the pair of shock absorbers such that the absorber force generated by said each of the pair of shock absorbers becomes equal to a difference between the required sprung damping force of said each of the pair of shock absorbers and the stabilizer-force-dependent sprung damping force.

4. The suspension system according to claim 3, wherein the control device is configured such that the damping coefficient of said each of the pair of shock absorbers that is changed by each of the damping-coefficient changing mechanisms becomes equal to a minimum one of predetermined damping coefficients when the sprung portion and the unsprung portion of said each of the pair of shock absorbers move toward or away from each other in a direction of the damping force generated by said each of the pair of shock absorbers.

5. The suspension system according to claim 1, wherein the control device is configured to execute, also under execution of the body-roll damping control, a body-roll-amount reducing control for reducing a roll amount of the body of the vehicle by controlling a part of the stabilizer force to become a force having a magnitude in accordance with roll moment that the body of the vehicle undergoes due to turning of the vehicle.

6. The suspension system according to claim 1,
wherein the stabilizer bar is constituted by a pair of stabilizer bar members each of which includes a torsion bar portion disposed so as to extend in a width direction of the vehicle and an arm portion which extends continuously from the torsion bar portion so as to intersect the torsion bar portion and which is connected at a leading end portion thereof to a wheel-holding portion that holds a corresponding one of left and right wheels, and
wherein the actuator is configured to rotate the torsion bar portions of the pair of stabilizer bar members relative to each other.

7. The suspension system according to claim 6,
wherein the actuator includes an electromagnetic motor as a power source, a decelerator which decelerates rotation of the electromagnetic motor, and a housing which holds the electromagnetic motor and the decelerator, and
wherein the torsion bar portion of one of the pair of stabilizer bar members is connected to the housing so as to be unrotatable relative to the housing while the torsion bar portion of the other of the pair of stabilizer bar members is connected to an output portion of the decelerator so as to be unrotatable relative to the output portion.

8. A suspension system for a vehicle, comprising:
a stabilizer apparatus which includes: (a) a stabilizer bar whose opposite ends are connected respectively to an unsprung portion on a left-wheel side of the vehicle and an unsprung portion on a right-wheel side of the vehicle and which generates, on the basis of a twist-reacting force thereof, a stabilizer force by which a distance between a sprung portion and the unsprung portion on the left-wheel side and a distance between a sprung portion and the unsprung portion on the right-wheel side are changed relative to each other; and (b) an actuator which includes an electromagnetic motor as a power source and which is configured to be operated by a force generated by the electromagnetic motor and to change the stabilizer force by an operation thereof;
a pair of shock absorbers of a hydraulic type each of which is provided between the sprung portion and the unsprung portion on a corresponding one of the left-wheel side and the right-wheel side and each of which generates an absorber force as a damping force with respect to a relative movement of the sprung portion and the unsprung portion on the corresponding one of the left-wheel side and the right-wheel side toward or away from each other, the pair of shock absorbers respectively including damping-coefficient changing mechanisms each configured to change a damping coefficient that is an ability to generate the absorber force and that is a basis of a magnitude of the absorber force to be generated; and
a control device which is configured to control the stabilizer force of the stabilizer apparatus by controlling the operation of the actuator of the stabilizer apparatus and which is configured to control the damping-coefficient changing mechanisms of the pair of shock absorbers,
wherein the control device is configured to execute a body-roll damping control in which at least a part of the stabilizer force is controlled to act as a roll damping force having a magnitude in accordance with a roll speed of a body of the vehicle,
wherein the control device is configured to change, in the body-roll damping control, a degree of the magnitude of the roll damping force by the stabilizer force and is configured to control, under execution of the body-roll damping control, the damping coefficient of each of the pair of shock absorbers such that a component of the absorber force which is generated by said each of the pair of shock absorbers and which is for damping roll of the body of the vehicle becomes smaller in an instance where the degree of the magnitude of the roll damping force by the stabilizer force is high than in an instance where the degree of the magnitude of the roll damping force by the stabilizer force is low, and
wherein the control device is configured such that, in the body-roll damping control, the degree of the magnitude of the roll damping force by the stabilizer force becomes lower in an instance where a charged amount of a battery that is a supply source of an electric power to the electromagnetic motor is smaller than in an instance where the charged amount of the battery is large.

9. The suspension system according to claim 8, wherein the control device is configured to control, in the body-roll damping control, the at least a part of the stabilizer force to act as a roll damping force having a magnitude in accordance with a roll speed of the vehicle body relative to a horizontal plane.

10. The suspension system according to claim 9,
wherein a damping force which is required to damp a movement of each of the sprung portions and which has a magnitude in accordance with a sprung-portion absolute speed that is a speed of the movement of said each of the sprung portions is defined as a required sprung damping force while a damping force with respect to the movement of said each of the sprung portions that depends on the roll damping force by the stabilizer force is defined as a stabilizer-force-dependent sprung damping force, and
wherein the control device is configured to control, under execution of the body-roll damping control, the damping coefficient of said each of the pair of shock absorbers such that the absorber force generated by said each of the pair of shock absorbers becomes equal to a difference between the required sprung damping force of said each of the pair of shock absorbers and the stabilizer-force-dependent sprung damping force.

11. The suspension system according to claim 10, wherein the control device is configured such that the damping coefficient of said each of the pair of shock absorbers that is changed by each of the damping-coefficient changing mechanisms becomes equal to a minimum one of predetermined damping coefficients when the sprung portion and the unsprung portion of said each of the pair of shock absorbers move toward or away from each other in a direction of the damping force generated by said each of the pair of shock absorbers.

12. The suspension system according to claim 8, wherein the control device is configured to execute, also under execution of the body-roll damping control, a body-roll-amount reducing control for reducing a roll amount of the body of the vehicle by controlling a part of the stabilizer force to become a force having a magnitude in accordance with roll moment that the body of the vehicle undergoes due to turning of the vehicle.

13. The suspension system according to claim 8,
wherein the stabilizer bar is constituted by a pair of stabilizer bar members each of which includes a torsion bar portion disposed so as to extend in a width direction of the vehicle and an arm portion which extends continuously from the torsion bar portion so as to intersect the torsion bar portion and which is connected at a leading end portion thereof to a wheel-holding portion that holds a corresponding one of left and right wheels, and
wherein the actuator is configured to rotate the torsion bar portions of the pair of stabilizer bar members relative to each other.

14. The suspension system according to claim 13,
wherein the actuator further includes a decelerator which decelerates rotation of the electromagnetic motor and a housing which holds the electromagnetic motor and the decelerator, and
wherein the torsion bar portion of one of the pair of stabilizer bar members is connected to the housing so as to be unrotatable relative to the housing while the torsion bar portion of the other of the pair of stabilizer bar members is connected to an output portion of the decelerator so as to be unrotatable relative to the output portion.

15. A suspension system for a vehicle, comprising:
a stabilizer apparatus which includes: (a) a stabilizer bar whose opposite ends are connected respectively to an unsprung portion on a left-wheel side of the vehicle and an unsprung portion on a right-wheel side of the vehicle and which generates, on the basis of a twist-reacting force thereof, a stabilizer force by which a distance between a sprung portion and the unsprung portion on the left-wheel side and a distance between a sprung portion and the unsprung portion on the right-wheel side are changed relative to each other; and (b) an actuator configured to change the stabilizer force by an operation thereof,
a pair of shock absorbers of a hydraulic type each of which is provided between the sprung portion and the unsprung portion on a corresponding one of the left-wheel side and the right-wheel side and each of which generates an absorber force as a damping force with respect to a relative movement of the sprung portion and the unsprung portion on the corresponding one of the left-wheel side and the right-wheel side toward or away from each other, the pair of shock absorbers respectively including damping-coefficient changing mechanisms each configured to change a damping coefficient that is an ability to generate the absorber force and that is a basis of a magnitude of the absorber force to be generated; and
a control device which is configured to control the stabilizer force of the stabilizer apparatus by controlling the operation of the actuator of the stabilizer apparatus and which is configured to control the damping-coefficient changing mechanisms of the pair of shock absorbers,
wherein the control device is configured to execute a body-roll damping control in which at least a part of the stabilizer force is controlled to act as a roll damping force having a magnitude in accordance with a roll speed of a body of the vehicle,
wherein the control device is configured to change, in the body-roll damping control, a degree of the magnitude of the roll damping force by the stabilizer force and is configured to control, under execution of the body-roll damping control, the damping coefficient of each of the pair of shock absorbers such that a component of the absorber force which is generated by said each of the pair of shock absorbers and which is for damping roll of the body of the vehicle becomes smaller in an instance where the degree of the magnitude of the roll damping force by the stabilizer force is high than in an instance where the degree of the magnitude of the roll damping force by the stabilizer force is low, and
wherein the control device is configured such that, in the body-roll damping control, the degree of the magnitude of the roll damping force by the stabilizer force becomes higher in an instance where an intensity of at least one of a heave vibration of the body of the vehicle and a pitch vibration of the body of the vehicle is high than in an instance where the intensity of the at least one of the heave vibration of the body of the vehicle and the pitch vibration of the body of the vehicle is low.

16. The suspension system according to claim 15, wherein the control device is configured to control, in the body-roll damping control, the at least a part of the stabilizer force to act as a roll damping force having a magnitude in accordance with a roll speed of the vehicle body relative to a horizontal plane.

17. The suspension system according to claim 16,
wherein a damping force which is required to damp a movement of each of the sprung portions and which has a magnitude in accordance with a sprung-portion absolute speed that is a speed of the movement of said each of the sprung portions is defined as a required sprung damping force while a damping force with respect to the movement of said each of the sprung portions that depends on the roll damping force by the stabilizer force is defined as a stabilizer-force-dependent sprung damping force, and
wherein the control device is configured to control, under execution of the body-roll damping control, the damping coefficient of said each of the pair of shock absorbers such that the absorber force generated by said each of the pair of shock absorbers becomes equal to a difference between the required sprung damping force of said each of the pair of shock absorbers and the stabilizer-force-dependent sprung damping force.

18. The suspension system according to claim 17, wherein the control device is configured such that the damping coefficient of said each of the pair of shock absorbers that is changed by each of the damping-coefficient changing mechanisms becomes equal to a minimum one of predetermined damping coefficients when the sprung portion and the unsprung portion of said each of the pair of shock absorbers move toward or away from each other in a direction of the damping force generated by said each of the pair of shock absorbers.

19. The suspension system according to claim 15, wherein the control device is configured to execute, also under execution of the body-roll damping control, a body-roll-amount reducing control for reducing a roll amount of the body of the vehicle by controlling a part of the stabilizer force to become a force having a magnitude in accordance with roll moment that the body of the vehicle undergoes due to turning of the vehicle.

20. The suspension system according to claim 15,
wherein the stabilizer bar is constituted by a pair of stabilizer bar members each of which includes a torsion bar portion disposed so as to extend in a width direction of the vehicle and an arm portion which extends continuously from the torsion bar portion so as to intersect the torsion bar portion and which is connected at a leading end portion thereof to a wheel-holding portion that holds a corresponding one of left and right wheels, and wherein the actuator is configured to rotate the torsion bar portions of the pair of stabilizer bar members relative to each other.

21. The suspension system according to claim 20, wherein the actuator includes an electromagnetic motor as a power source, a decelerator which decelerates rotation of the electromagnetic motor, and a housing which holds the electromagnetic motor and the decelerator, and wherein the torsion bar portion of one of the pair of stabilizer bar members is connected to the housing so as to be unrotatable relative to the housing while the torsion bar portion of the other of the pair of stabilizer bar members is connected to an output portion of the decelerator so as to be unrotatable relative to the output portion.

22. A suspension system for a vehicle, comprising:

a stabilizer apparatus which includes: (a) a stabilizer bar whose opposite ends are connected respectively to an unsprung portion on a left-wheel side of the vehicle and an unsprung portion on a right-wheel side of the vehicle and which generates, on the basis of a twist-reacting force thereof, a stabilizer force by which a distance between a sprung portion and the unsprung portion on the left-wheel side and a distance between a sprung portion and the unsprung portion on the right-wheel side are changed relative to each other; and (b) an actuator configured to change the stabilizer force by an operation thereof;

a pair of shock absorbers of a hydraulic type each of which is provided between the sprung portion and the unsprung portion on a corresponding one of the left-wheel side and the right-wheel side and each of which generates an absorber force as a damping force with respect to a relative movement of the sprung portion and the unsprung portion on the corresponding one of the left-wheel side and the right-wheel side toward or away from each other, the pair of shock absorbers respectively including damping-coefficient changing mechanisms each configured to change a damping coefficient that is an ability to generate the absorber force and that is a basis of a magnitude of the absorber force to be generated; and a control device which is configured to control the stabilizer force of the stabilizer apparatus by controlling the operation of the actuator of the stabilizer apparatus and which is configured to control the damping-coefficient changing mechanisms of the pair of shock absorbers, wherein the control device is configured to execute a body-roll damping control in which at least a part of the stabilizer force is controlled to act as a roll damping force having a magnitude in accordance with a roll speed of a body of the vehicle, wherein the control device is configured to change, in the body-roll damping control, a degree of the magnitude of the roll damping force by the stabilizer force and is configured to control, under execution of the body-roll damping control, the damping coefficient of each of the pair of shock absorbers such that a component of the absorber force which is generated by said each of the pair of shock absorbers and which is for damping roll of the body of the vehicle becomes smaller in an instance where the degree of the magnitude of the roll damping force by the stabilizer force is high than in an instance where the degree of the magnitude of the roll damping force by the stabilizer force is low, and wherein the control device is configured such that, in the body-roll damping control, the degree of the magnitude of the roll damping force by the stabilizer force becomes higher in an instance where a running speed of the vehicle is high than in an instance where the running speed of the vehicle is low.

23. The suspension system according to claim 22, wherein the control device is configured to control, in the body-roll damping control, the at least a part of the stabilizer force to act as a roll damping force having a magnitude in accordance with a roll speed of the vehicle body relative to a horizontal plane.

24. The suspension system according to claim 23, wherein a damping force which is required to damp a movement of each of the sprung portions and which has a magnitude in accordance with a sprung-portion absolute speed that is a speed of the movement of said each of the sprung portions is defined as a required sprung damping force while a damping force with respect to the movement of said each of the sprung portions that depends on the roll damping force by the stabilizer force is defined as a stabilizer-force-dependent sprung damping force, and wherein the control device is configured to control, under execution of the body-roll damping control, the damping coefficient of said each of the pair of shock absorbers such that the absorber force generated by said each of the pair of shock absorbers becomes equal to a difference between the required sprung damping force of said each of the pair of shock absorbers and the stabilizer-force-dependent sprung damping force.

25. The suspension system according to claim 24, wherein the control device is configured such that the damping coefficient of said each of the pair of shock absorbers that is changed by each of the damping-coefficient changing mechanisms becomes equal to a minimum one of predetermined damping coefficients when the sprung portion and the unsprung portion of said each of the pair of shock absorbers move toward or away from each other in a direction of the damping force generated by said each of the pair of shock absorbers.

26. The suspension system according to claim 22, wherein the control device is configured to execute, also under execution of the body-roll damping control, a body-roll-amount reducing control for reducing a roll amount of the body of the vehicle by controlling a part of the stabilizer force to become a force having a magnitude in accordance with roll moment that the body of the vehicle undergoes due to turning of the vehicle.

27. The suspension system according to claim 22, wherein the stabilizer bar is constituted by a pair of stabilizer bar members each of which includes a torsion bar portion disposed so as to extend in a width direction of the vehicle and an arm portion which extends continuously from the torsion bar portion so as to intersect the torsion bar portion and which is connected at a leading end portion thereof to a wheel-holding portion that holds a corresponding one of left and right wheels, and wherein the actuator is configured to rotate the torsion bar portions of the pair of stabilizer bar members relative to each other.

28. The suspension system according to claim 27, wherein the actuator includes an electromagnetic motor as a power source, a decelerator which decelerates rotation of the electromagnetic motor, and a housing which holds the electromagnetic motor and the decelerator, and wherein the torsion bar portion of one of the pair of stabilizer bar members is connected to the housing so as to be unrotatable relative to the housing while the torsion bar portion of the other of the pair of stabilizer bar members is connected to an output portion of the decelerator so as to be unrotatable relative to the output portion.

* * * * *